(12) United States Patent
Sargin et al.

(10) Patent No.: US 9,996,847 B2
(45) Date of Patent: *Jun. 12, 2018

(54) MESSAGE CONTROL SYSTEM

(71) Applicants: Anthony Sargin, Lyndhurst, OH (US); Brian Asquith, Cleveland, OH (US)

(72) Inventors: Anthony Sargin, Lyndhurst, OH (US); Brian Asquith, Cleveland, OH (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/068,633

(22) Filed: Mar. 13, 2016

(65) Prior Publication Data
US 2016/0196569 A1    Jul. 7, 2016

Related U.S. Application Data

(63) Continuation of application No. 13/843,839, filed on Mar. 15, 2013, now Pat. No. 9,288,655.

(60) Provisional application No. 61/641,272, filed on May 1, 2012.

(51) Int. Cl.
| | |
|---|---|
| *H04W 4/00* | (2018.01) |
| *H04M 3/00* | (2006.01) |
| *G06Q 30/02* | (2012.01) |
| *H04W 4/26* | (2009.01) |
| *H04L 12/14* | (2006.01) |
| *G09B 7/06* | (2006.01) |
| *H04W 4/22* | (2009.01) |
| *H04W 4/14* | (2009.01) |

(52) U.S. Cl.
CPC .......... *G06Q 30/0212* (2013.01); *G09B 7/06* (2013.01); *H04L 12/1453* (2013.01); *H04W 4/14* (2013.01); *H04W 4/22* (2013.01); *H04W 4/26* (2013.01)

(58) Field of Classification Search
CPC .. H04W 4/00–4/02; H04W 4/06; H04W 4/08; H04W 4/12; H04W 4/14; H04W 4/18; H04W 4/20; H04W 4/26; H04W 8/18–8/245; H04W 12/5895; H04W 1/72552

See application file for complete search history.

(56) References Cited

U.S. PATENT DOCUMENTS

| | | | | |
|---|---|---|---|---|
| 8,699,998 | B2* | 4/2014 | Sprigg | H04L 51/12 455/410 |
| 2006/0046239 | A1* | 3/2006 | Allen | G09B 7/00 434/353 |
| 2011/0055546 | A1* | 3/2011 | Klassen | G06F 21/305 713/150 |
| 2012/0202185 | A1* | 8/2012 | Jabara | G09B 5/00 434/350 |
| 2013/0004929 | A1* | 1/2013 | Otwell | G09B 5/00 434/350 |

(Continued)

*Primary Examiner* — San Htun
(74) *Attorney, Agent, or Firm* — Brian Asquith

(57) ABSTRACT

Embodiments are presented for controlling usage of a communications device, whereby for a given number of messages generated from the device the operator (e.g., a child, person, etc.) has to successfully answer a question before a further batch of messages can be sent. The number of messages that can be sent before a question is to be answered can be configured by a parent. Further, a modifiable data store can be utilized to store questions, from which questions for presentation on the communication device can be sourced. The questions can relate to subject matter the child is studying at school, a standardized test, trivia, provided by a third party.

20 Claims, 16 Drawing Sheets

(56) References Cited

U.S. PATENT DOCUMENTS

2013/0030884 A1* 1/2013 Faber ................ G06Q 30/0209
　　　　　　　　　　　　　　　　　　　　　　705/14.1

* cited by examiner

MESSAGE CONTROL SYSTEM

RELATED APPLICATIONS

This application claims priority to U.S. Provisional Application Ser. No. 61/641,272, filed on May 1, 2012, and entitled "Message Control System". This application is additionally a continuation of U.S. patent application Ser. No. 13/843,839, filed on Mar. 15, 2013, and entitled "Message Control System". The entireties of each of these applications are incorporated herein by reference.

TECHNICAL FIELD

The subject specification relates generally to controlling operation of a communications device based upon successful completion of one or more tests to facilitate granting further use of the communications device.

BACKGROUND

With the prevalence of communication devices (e.g., mobile phones, cellular phones, tablet PCs, laptops, and the like), teenagers, adolescents, and children are often generating and sending a large number of messages (e.g., text messages) from their communication devices to friends, etc. However, the service plan for the communication device (e.g., service plan for a mobile phone) is typically paid for by the child's parent. Hence, disagreement can arise between the parent(s) and the child regarding the amount of messages sent for a given billing period of a service plan. The parent is concerned by the volume of messages being generated by the child, and the time spent in message exchange, while the child considers the number of messages to be normal in view of maintaining communication with their friends, peers, family, etc. Similarly, operation of the communication device in terms of minutes spent talking can also be of concern to a parent.

Furthermore, the academic achievement of the child is also of concern to the parent, with the parent often looking for any means to provide the child with a stimulus and/or incentive for learning to enhance the child's academic achievement.

SUMMARY

Various technologies pertaining to controlling operation of messaging or other pursuit are described herein. In an exemplary, non-limiting embodiment, a system is presented, wherein the system can include a memory including at least one computer-executable instruction and a processor configured to execute the at least one computer-executable instruction, wherein in response to execution by the processor, the at least one computer-executable instruction implements various components. The components can comprise a messaging component configured to transmit at least one message from the system to a remote device, further configured to tally a number of messages transmitted from the system to a remote device and determine whether the number of messages transmitted equals a maximum number of messages to be transmitted. In response to determining the number of messages transmitted equals the maximum number of messages to be transmitted, the messaging component can deactivate an ability to transmit a subsequent message to the remote device.

In a further, exemplary, non-limiting embodiment, that comprises controlling operation of a device is presented. The method comprising receiving, by a system including a processor, a setting for a maximum number of messages M to be sent; further transmitting, by the system, a number of messages N to a remote device, and counting, by the system, the number of messages N sent. Based on the number of message N sent, a determination can be made by the system, whether N=M. Further, in response to determining N=M, sending of a subsequent message can be prevented.

A further exemplary, non-limiting embodiment comprises a computer readable storage medium comprising computer executable instructions that, in response to execution cause a computing system including a processor to perform operations comprising setting a maximum number of messages that can be sent, counting a number of messages sent, and determining whether the number of messages sent equals the maximum number of messages that can be sent. In response to determining the number of messages sent being equal to the maximum number of messages that can be sent, an operation can further be implemented to deactivate an ability to send a subsequent message. Further operations can include presenting a question and a plurality of answers pertaining to the question, receiving an input answer in the plurality of answers, and determining whether the input answer is a correct answer to the question. In response to determining the input answer is the correct answer, an operation can further be implemented activating the ability to send a subsequent message.

DETAILED DESCRIPTION

Figure 1:
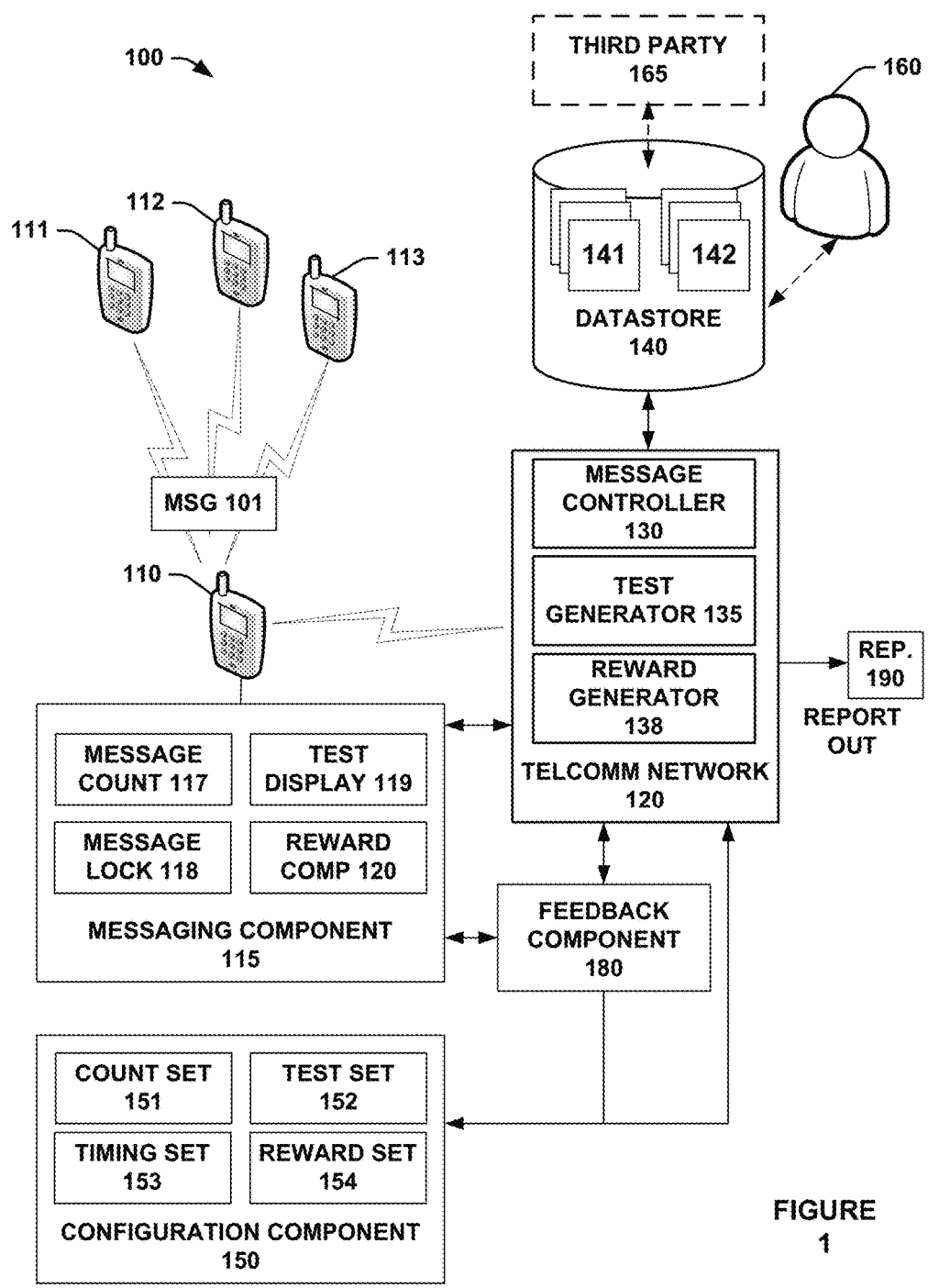
FIG. 1 is a block diagram illustrating exemplary, non-limiting embodiments facilitating control of messaging from a device.

The various embodiments are now described with reference to the drawings, wherein like reference numerals are used to refer to like elements throughout. In the following description, for purposes of explanation, numerous specific details are set forth in order to provide a thorough understanding of the various embodiments. It can be evident, however, that the various embodiments can be practiced without these specific details. In other instances, well-known structures and devices are shown in block diagram form in order to facilitate describing the various embodiments.

The various exemplary, non-limiting embodiments relate in part to controlling usage of a device based upon an entity (e.g., a child, student, teenager, adolescent, youth, adult, person, etc., hereinafter referred to as a child) successfully completing one or more questions. It is to be appreciated that while the term 'question' is utilized herein, the term is not limited simply to the operation of question/answer but pertains to any suitable exercise, test, task, challenge, activity, and the like, which is to be completed to facilitate the operation of activation/deactivation of a message component. A message component can be in operation on the device (e.g., a communications device such as a mobile device) such that for every N messages sent from the device, the device switches to a locked state until the child can successfully answer a question presented on the device, where N is a positive integer greater than 0. For example, the message component can be configured such that after 10 text messages have been sent from the device a question is to be presented on the device. The child then has to pass the test (e.g., correctly answer the question) to unlock the messaging component on the device and have the ability to send further text messages, e.g., continuing with the example above, the ability to send another 10 text messages is re-enabled. The process of text message generation and test presentation continues ad infinitum unless service is terminated, device deactivated (e.g., telephone service terminated), etc. For example, the child can send another 10 messages and after the $10^{th}$ message is sent, another question can be presented to be successfully completed, which upon successful completion another 10 messages are available to be sent, etc.

It is to be appreciated that while the above is described with regard to generation and transmission of messages, the various embodiments presented herein can be applied to any other suitable application, such as controlling the availability of phone calls (duration, number, etc.), playing games (e.g., time spent playing video games, time spent playing video games on the device, etc.), watching television, etc., as further described herein.

It is further to be appreciated that while the example scenarios presented herein relate to a parent and a child the various embodiments presented herein are not so limited and are applicable to any scenario where an entity (e.g., a parent) places a requirement for a test to be successfully completed before ability to operate a device (e.g., a communications device) is granted (e.g., to a child). In another non-limiting, exemplary embodiment, the device can be owned and operated by the same entity (e.g., an adult), who can elect to opt into the message control application as a means for them to be presented with a question(s) as part of their own requirements such as study/revision practice (e.g., a student studying for any of the SAT, MCAT, LSAT, etc.), entertainment, etc.

Furthermore, it is to be appreciated that the various embodiments presented herein are not limited to a device such as a communication device (e.g., a mobile phone) but are applicable to any component, device, etc., where the concept of controlling operation of the component, device, etc., based on successful completion of a test, or other suitable exercise/operation can be utilized.

FIG. 1 illustrates an exemplary, non-limiting embodiment for control of messaging. A device 110 (e.g., any device capable of message communication, such as a cellular phone, personal computer, computing device, tablet computer, laptop computer, wearable computer, body-borne computer, gaming device, interactive television, visual display component, video game console, and the like) has a messaging component 115 operating thereon. It is to be appreciated that device 110 is not limited to being mobile in operation but rather is presented to convey the concept of message generation/communication and as such, the various embodiments presented herein, are applicable to any device, component, application, etc., involved with message generation/communication, whether the device, component, application, etc., be used in a mobile manner or fixed location manner. Messaging component 115 can be any component, device, application, etc., suitable for the generation and transmission of messages, etc., from device 110, for example, a short message service (SMS), multimedia messaging service (MMS), enhanced messaging service (EMS), a text messaging service, and the like. Messaging component 115 can facilitate messaging between device 110 and any other device configured to receive a message generated by device 110, e.g., the generated message (e.g., message 101) can be received by any of devices 111, 112, and/or 113, etc. As described further below, messaging component 115 can comprise of a plurality of components, devices, applications, etc., to facilitate operation of the various exemplary, non-limiting embodiments as presented herein. In an exemplary, non-limiting embodiment, messaging component 115 can comprise of a message counter component 117 which can be utilized to count (tally) the number of messages generated by device 110. In a further, exemplary, non-limiting embodiment, messaging component 115 can also comprise of a message lock component 118 which can be utilized to lock operation of messaging component 115 such that no more messages can be generated until a question has been successfully answered, as described further herein. In a further embodiment, messaging component 115 can further comprise, or be associated with, a test display component 119, such as a display component incorporated into device 110, suitable for interaction pertaining to message 101 generation, presentation of a question 141 (or question 250, or answer(s) 252-258, etc.), or other messaging (e.g., a tally indicator 212, 222, or 232, message state 214, 224, or 234), etc., associated with presentation of messages, questions, answers, etc., on device 110.

It is to be appreciated that while not shown, messaging component 115 can comprise, or be associated with (e.g., communicatively coupled) various components, devices, applications, etc., as required to facilitate messaging by device 110, where such components, devices, applications, etc., can comprise antenna, transmitter/receiver, signal modulation/demodulation, signal encoding/decoding, etc., as is known in the art for generation and conveyance of messages across communicatively coupled devices.

As well as being in communication with any of devices 111, 112, and/or 113, device 110 can also be in communication with at least one source of telecommunication services being utilized by device 110. For example, device 110 can be in communication with telecommunication network 120, wherein telecommunication network 120 comprises the necessary components (e.g., servers, communication towers, etc.) to facilitate operation of device 110, e.g., communication of device 110 with other devices 111, 112, and 113. In an aspect, telecommunication network 120 can include one or more components required to, for example, facilitate billing of services utilized by device 110, one or more components, devices, applications, etc., to facilitate operation of device 110, etc.

In an exemplary, non-limiting embodiment, telecommunication network 120 can comprise message controller component 130 which can be utilized, for example, in conjunction with messaging component 115, to control operation of device 110 with regard to generation and availability of messages at device 110.

During operation of device 110 (e.g., by an entity such as a child (not shown)) message counter component 117 can maintain a tally of how many messages have been generated with the device 110. In an aspect, each count in the tally can be forwarded to the message controller component 130. In another aspect, an indication can be forwarded from the message count component 117 to message controller component 130, for example, in the event of a defined configuration of counts has been reached, or is about to be reached, etc.

Figure 2:
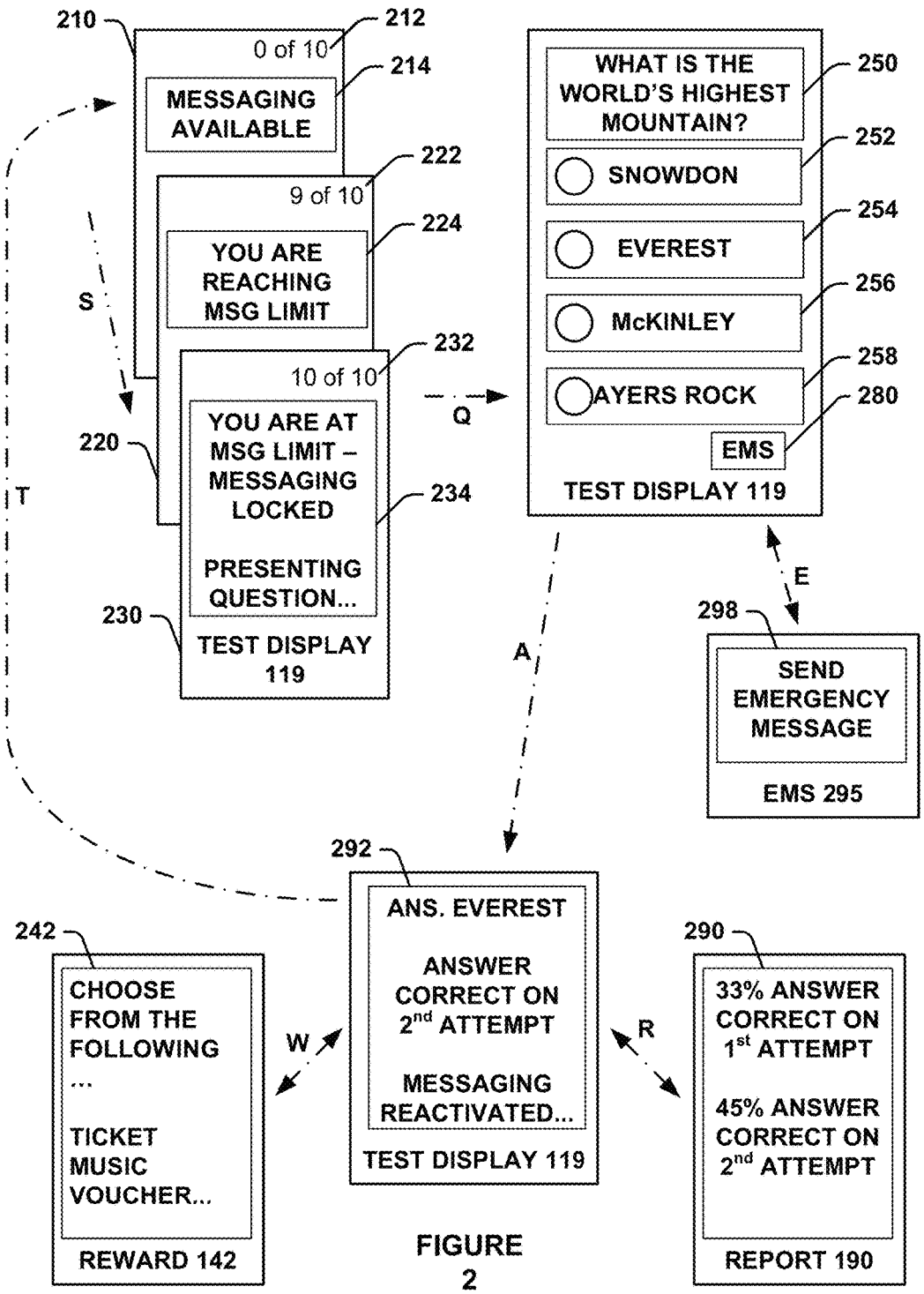
FIG. 2 is a block diagram illustrating exemplary, non-limiting embodiments of screens for presentation during various stages of messaging control.

Further, a test generator component 135 can be associated with the telecommunication network 120 and can be utilized to generate at least one question, test, and the like. Test generator component 135 can be utilized in conjunction with data store 140 which can comprise a plurality of questions 141 (and associated answers, e.g., 252, 254, 256, 258, as necessary, as shown in FIG. 2) for presentation on device 110. In an exemplary, non-limiting embodiment, data store 140 can be populated by any suitable means. For example, data store 140 can comprise of a database containing questions 141 from any suitable source, such as the child operator of device 110 is in 8$^{th}$ grade and thus questions 141 suitable for an 8$^{th}$ grade student are stored in data store 140 for presentation on device 110. In another example, questions 141 may be presented from a database relating to exams assessing a particular level of minimum education/high school proficiency, for example, to comply with the 'No Child Left Behind (NCLB) Act', the Regents Examination of New York, Florida Comprehensive Assessment Test (FCAT), Massachusetts Comprehensive Assessment Test (MCAT), and similar federal, state, or locally mandated examinations. In another example, the child is studying to go to college and hence questions 141 pertaining to a standardized test (e.g., SAT, ACT, etc.) can be drawn from data store 140, wherein the questions may be provided by an organization associated with the standardized test, e.g., in the case of the SAT, the College Board.

It is to be appreciated that while the various embodiments and aspects presented herein have been focused on a child operating device 110, the various embodiments can be directed towards any person operating device 110 and generating a message(s) 101 therefrom. For example the person can be a student and is looking to apply to an establishment of higher learning such as medical school and hence data store 140 can comprise questions 141 relating to the Medical College Admission Test (MCAT) (wherein, the student may be the person that pays for their phone plan as opposed to their parent). In another embodiment, the device 110 can be operated by a person who simply likes to test their general knowledge and thus questions 141 retrieved from data store 140 can be trivia questions, or any question in data store 140 can be retrieved for presentation to the person (wherein, the person may be the entity that pays for their phone plan as opposed to their parent).

Alternatively, a person can be studying for an intelligent quotient test (e.g., MENSA), where not only can the question(s) be presented in a textual manner, the ability of the test display component 119 (e.g., a smartphone display, computer display, etc.) to render graphics can be utilized to present questions 141 which are visual in nature such as symbolic questions often found in a test such as administered by MENSA.

It is to be appreciated that the various embodiments presented herein, in part, relate to the concept of presentation of a question, etc., that has to be correctly fulfilled to facilitate further operation such as messaging, hence the question 141, etc., is not limited to being entirely textual in nature but rather can be any of textual, visual, tactile, audible (e.g., audibly presented, audibly focused such as a music fragment), or combination thereof, etc., as supported by components comprising a device 110, such as display, touchscreen, audio speakers. Further, the response to the question can be entered by any suitable means such as scrolling to the chosen answer by means of a mouse, keypad, etc., as well as utilizing the functionality of a touchscreen display, audible input such as a microphone coupled to a voice user interface (not shown), tactile input, and the like.

In another embodiment, generation of test questions can be conducted in conjunction with a child's schoolwork, whereby a teacher 160 (or other suitable entity) can provide questions 141 to data store 140 which can pertain to the child's schoolwork. To facilitate population of data store 140 with questions 141, the teacher 160 can be required to perform any suitable authentication and/or authorization operation to gain access to data store 140, whereupon successful compliance with the authentication/authorization operation, teacher 160 can perform any necessary operations, e.g., submit new questions 141, delete old questions, etc.

In a further embodiment, questions for presentation on test display component 119 can be sourced from a third party, e.g., third party 165. In an exemplary, non-limiting embodiment, such third party 165 can be an entertainment company, wherein questions 141 can be generated by the entertainment company pertaining to a band, singer, concert, show, film, book, publication, sports team, sports individual, and the like, which the entertainment company wants to bring to the attention of a given audience, e.g., wants to advertise. Alternatively, third party 165 can be a company having a product they wish to advertise/market, such as clothing, sporting goods, travel, computing, etc. In such a manner of operation, it is possible that the company operating the telecommunications network 120 (e.g., VERIZON, AT&T, CINGULAR, etc.) can require the third party 165

(e.g., the entertainment company, advertiser, marketer, etc.) fulfill an obligation, such as make a payment, to facilitate provision of the question(s) 141, thereby acting as a revenue generation stream for the entity operating the telecommunications network 120.

In another aspect, owing to the global nature of the telecommunications industry in contemporary society, data store 140 can comprise of questions 141 which are multilingual in nature and thus the various embodiments presented herein can be applicable to any language or region of operation of device 110.

As each question (or batch of questions) is generated by the test generator 135 and forwarded to the messaging component 115, the question can be presented to the operator (e.g., child, person, student, etc.) of device 110. Test display 119 component can be utilized to present a question 141. For example, turning briefly to FIG. 2, a sequence S of message control screens 210, 220, and 230 are illustrated as being presented on test display component 119. Screen 210 can indicate, at tally indicator 212 (e.g., per tally stored at message count component 117), that 0 out of the 10 available messages have been sent, and 'messaging is available' 214. As the sequence of messages increases the tally increases such that on screen 220, 9 of the available 10 messages have been sent, as indicated by tally indicator 222. A warning message 224 can be presented indicating that the number of messages sent is approaching a message limit (e.g., as set via count set component 151). Upon transmission of a next message, screen 230 can be displayed, where the number of messages that have been sent is equal to the maximum number, as indicated by tally indicator 232. Further, a message 234 can be presented to the user that the number of maximum messages available has been reached, the ability to transmit message(s) from the device has been deactivated and a question (e.g., question 141 forwarded from data store 140) is about to be presented as indicated by arrow Q.

FIG. 2 further illustrates a question 250 can be presented by and/or on test display component 119 along with a plurality of possible answers 252, 254, 256, 258. In response to question 250 being displayed, the operator of device 110 can select from any of the four possible answers 252-258 in an attempt to correctly answer question 250. In this example, question 250 is "What is the world's highest mountain above sea level?" with four possible answers 'Snowdon' (252), 'Everest' (254), 'McKinley' (256), and 'Ayers Rock' (258), whereupon selection of the correct answer (which in this case is 'Everest' (254)) the ability to message from the device 110 can be re-activated (e.g., messaging component 115 can be unlocked) and a new tally of messages (for example, 10 new messages) are available and generation thereof further monitored.

As described further below, an 'emergency' message 295 comprising the message 298 can be sent while the ability to send a message 101 from the device 110 can be currently de-activated (e.g., while waiting for a correct answer to be submitted to a displayed question) (as indicated by arrow E). To facilitate initiation of transmission of an emergency message 295, 'emergency' message button 280 can be presented on test display 119, where in the event of test display component 119 being a touchscreen, selection of the 'emergency' message button 280 can be detected whereby a message generation screen 295 can be presented for generation and transmission of the 'emergency' message 298. It is to be appreciated that initiation of an 'emergency' message 298 is not limited to activation of a virtual 'emergency' message button 280 on test display 119, but can be initiated by any suitable means such selection of a specific key/key combination on a keyboard associated with the device 110, an audible command for a voice recognition system operating on device 110 such as 'send emergency message', and the like.

As shown in FIG. 2, after successful answer selection (arrow A), test display component 119 can display message 292 indicating that the question 250 was correctly answered and the ability to send message(s) 101 is being reactivated, where the screen sequence advances, via arrow T, to screen 210, where the tally indicator 212 can be reset to 0 of 10 messages available, and a message 214 can be presented indicating that messaging is available.

A consideration for operation of the system presented in FIG. 1 is the configuration of how many messages can be allowed to be sent before a test is to be performed. A further consideration pertains to what questions are to be presented in the test. In an exemplary, non-limiting embodiment, device 110 used by the child is part of a 'family plan', a family plan of cellular phones such that the parent(s) phone and the child's phone are administered and paid for by the parent. Hence, the parent, as well as taking an interest in the education of the child, the parent can also be able to manage operation of device 110 utilized by the child. To facilitate education of the child and operation of device 110, a configuration component 150 can be utilized by the parent. Configuration component 150 can be remotely located from device 110, or can be co-located with device 110. For example, the configuration component 150 can operate on any suitable device (e.g., a computer, cellular phone, laptop, device, etc.) which can be in communication with telecommunication network 120, e.g., via cellular communication, via a local area network (LAN), via a wide area network (WAN), internet, etc, or further, can be in direct communication with components comprising device 110, such as messaging component 115, for example. In an alternative embodiment, configuration component 150 can be located on device 110 and can be used to configure operation of the various embodiments presented herein regarding control of messaging on device 110. Configuration component 150 can include a count set component 151, wherein the count set component 151 can be utilized to configure how many messages 101 are allowed to be generated before a test question 141 is to be answered, as well as how many questions are to be answered before the ability to send messages from device 110 is re-activated, for example, two questions are to be correctly answered before messaging via messaging component 115 is re-activated. Configuration component 150 can further comprise a test set component 152 which can be utilized to select a group of questions (e.g., questions 141) which are to be presented on device 110, e.g., via test display component 119. As described above, the questions 141 which comprise data store 140 can be of any nature. Hence, a listing (i.e., a general listing, a particular listing, etc.) of all the questions 141 in data store 140 can be presented via test set component 152 from which a particular set of questions (e.g., SAT based questions) can be selected for presentation on display 110, via test display component 119.

Figure 3:
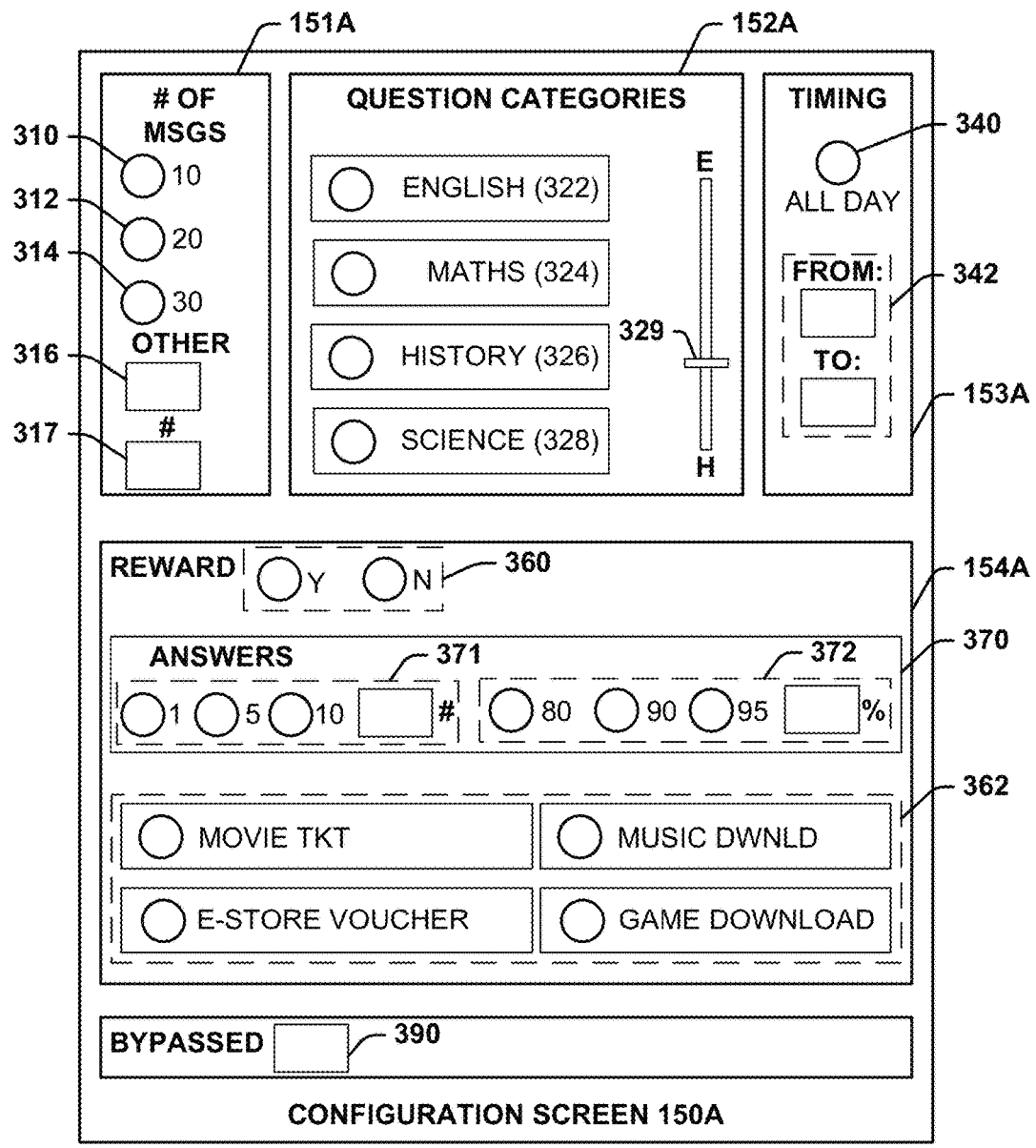
FIG. 3 is a block diagram illustrating exemplary, non-limiting embodiments for message, test and reward configuration.

Turning to FIG. 3, an exemplary, non-limiting depiction of a possible configuration screen 150A associated with configuration component 150 is shown. As depicted, count set component screen 151A (associated with count set component 151) is shown with a number of value settings which can be selected to enable control of how many messages 101 are allowed to be generated before the message control system (e.g., messaging component 115) is de-activated and a question 141 is presented (e.g., on test display component 119). In an example configuration, count set component screen 151A presents a plurality of fixed message numbers 310, 312, and 314 which can be of a simple 'click to select' operation such as radio buttons. Alternatively, if a different number of messages are to be counted compared with the values 310, 312, and 314, the value can be entered in 316. Any suitable means for selection/entry of messages can be utilized. Further extending the example display, test set component screen 152A (associated with test set component 152) can comprise of any question groupings (e.g., questions 141) stored in data store 140, where in this example four categories English (322), Mathematics (324), History (326) and/or Science (328) can be selected. It is to be appreciated that where a plurality of question groupings/subjects are available more than one group can be selected if so desired. Further, a sequence of presentation can be established, such as upon completion of one question group a subsequent group of questions are presented, e.g., when all the mathematics related questions have been presented, science questions are then presented. Hence, in such operation, a child can work their way through a series of questions of one level of perceived difficulty to be followed by harder questions either on the same subject or a disparate subject. Any suitable means for question selection can be utilized, as known in the art, where in the basic rendering illustrated in FIG. 3, a slider control 329 can be utilized to select questions based on difficulty, from Easiest to Hardest, where such operation of slider control 329 facilitates different question(s) and/or question categories/groupings being presented (e.g., scrolled through) on test set screen 152A whereupon when a particular question/question group of a perceived difficulty is displayed it can be selected.

A timing set component screen 153A (associated with timing set component 153) can be utilized to configure when the message control system (e.g., messaging component 115) is operable. Upon selection of 340, the message control system is active all day. Alternatively, upon entering values into window(s) 342, the operation of the message control system can be limited to particular hours of the day, e.g., school hours. While not shown, the timing set component screen 153A can present any required variables (e.g., particular weekday(s), day(s) of the weekend, weekend, 12 hr clock, 24 hr clock, etc.) to facilitate selection of operation of the message control system.

A reward configuration screen 154A can also be presented, enabling one or more rewards (e.g., any of rewards 362) to be selected and made available to the operator (e.g., the child) of device 110 upon satisfying a particular criteria, e.g., successfully answering a question, a number of questions, a sequence of questions, etc., (per Answer configuration 370, numerical approach 371, percentage approach 372) as explained further below. As further explained below, feedback of the number of 'bypass' messages can be presented in 'Bypassed' window 390, as further explained below. In an embodiment, an option can be provided that while there can be a requirement to answer X number of questions other incentives can be provided. For example, a requirement can be configured that 5 questions are to be correctly answered before messaging can be reactivated, a incentive of 'answer the first X questions correctly in T seconds' can be configured. Hence, in an example, if the first 3 of the 5 questions are answered within a given timeframe (e.g., 30 seconds) the remaining 2 questions do not need to be answered and messaging can be reactivated.

The various entries, selections, settings, etc., performed on configuration screen 150A are used to update the various configurations of any of count set configuration component 151, test set configuration component 152, timing set component 153, and reward set configuration component 154, as required. The entries, etc., can be forwarded from configuration component 150 to any component comprising the message control system, such as test generator 135, reward generator 138, message controller 130, messaging component 115 (and subcomponent 117, 118, 119, 120) as required to facilitate message control, emergency messaging/bypass, reward generation, question/answer selection, etc.

In a further exemplary, non-limiting embodiment, the various aspects presented herein can be used to determine the success with which the operator (e.g., a child) of device 110 answers the question(s). Returning to FIG. 2, it is possible in the best case scenario to get the correct answer in one attempt, i.e., answer 254 is selected at the first try. In a worst case scenario, the correct answer is not achieved until the fourth try, e.g., chosen last from the four 252, 254, 256, 258 answers available.

The degree of success with which questions are answered can be tallied (e.g., by message count component 117) and provided to a third party as a means for assessing the intelligence, or other measure, of the child. As shown in FIG. 1, the degree of success can be reported out (e.g., report 190) to any suitable party, for example, report 190 can be provided to educational institutions (such as schools, colleges, universities, etc.) as a means for establishing intelligence of the child. As shown in FIG. 2, with arrow R, report 190 can provide details 290 of success of answering a question and other metrics (e.g., at first attempt, second attempt, question difficulty, etc.). Further, the third party 165 (e.g., an educational institution) can provide the questions 141 in data store 140 as a means of controlling which questions the child is to be assessed against.

In another exemplary, non-limiting embodiment, the degree of success (e.g., details 290) can be provided via a feedback component 180. In an exemplary non-limiting embodiment, feedback component 180 can be incorporated into device 110 and thus provides feedback to the operator of device 110 on the success with which the person is answering question(s) 141. In another exemplary, non-limiting embodiment, feedback component 180 can also be co-located with configuration component 150, operating on any suitable device (e.g., a computer, cellular phone, laptop, mobile device, etc.) and thus provides feedback to the person configuring the messaging operation (e.g., how any of messaging component 115, question 141 selection, etc., are configured) to facilitate their understanding of how the entity (e.g., the child) operating the device 110 is performing with regard to successfully answering questions 141. In another aspect, the child can be ranked against other children taking the same test to facilitate assessment of how well the child is doing in relation to their peers/contemporaries, where the ranking can be provided via feedback component 180.

In a further aspect, as previously mentioned, a reward 142 or other incentive can generated based upon successful completion of one or more questions 141. For example, if the child maintains a particular percentage for answering questions 141 correctly on the first attempt then a reward 142 can be presented by reward component 120 associated with messaging component 115. The number of answers to be answered for a reward to be available can be configured, for example, answers configuration screen 370 of configuration component screen 150A, where a reward can be based on a number 371 of answers answered correctly, e.g., 1, 5, 10, or other value # which can be entered, or for example a reward can be based on percentage 372 of answers answered correctly such as 80% of questions are answered correctly on a first attempt, 90% on a first attempt, 95% on a first attempt, or other value % can be entered, per FIG. 3. It is to be appreciated that while not shown a plurality of ways of configuring a reward based on answer success can be utilized, such as percentage of questions answered on a first attempt in conjunction with percentage of questions to be answered on a second attempt, or how many questions are to be answered on a first attempt, how many questions are to be answered on a second attempt, etc. A plurality of ways of configuring the reward criteria (e.g., answer/%, answer/attempts, etc.) are known in the art and are not further described herein.

For example, a reward 142 can be of any suitable form such as concert ticket(s), theatre ticket(s), movie ticket(s), a music download, redeemable coupon, and the like, and stored in electronic format in data store 140. In an exemplary, non-limiting embodiment, the reward 142 can be provided by the third party 165, as previously described, such as the third party 165 provides a music download, movie tickets, etc. To facilitate generation of a reward 142, a reward configuration component 154 (and associated reward configuration screen 154A, as shown in FIG. 3) can be utilized to select what sort of reward 142 is to be provided, e.g., via reward component 120 on device 110. For example, data store 140 comprises a plurality of rewards 142, such as concert tickets, movie tickets, apparel, etc. In an exemplary, non-limiting embodiment, a reward configuration component 154 (via associated reward configuration screen 154A) can be utilized to select movie tickets will be presented to the child (e.g., via reward component 120 and/or test display 119) upon the child maintaining a 95% rate of successfully answering questions 141 in 2 attempts or less, for example. In an alternative embodiment, a reward 142 can be provided by any suitable means such as via e-mail, mailed coupon, in-person redemption, etc.

In an exemplary, non-limiting embodiment, a reward generator component 138 can be utilized, in conjunction with rewards 142 and reward configuration component 154 to facilitate selection and presentation of a reward 142 on device 110 (e.g., via reward component 120 and/or test display 119). For example, upon selection of a reward being movie ticket(s) by reward configuration component 154, data store 140 can be queried by reward generator component 138 to identify rewards 142 in data store 140 that are movie tickets, along with any other pertinent information/criteria associated with the reward 142, such as, in the example of movie tickets, an age restriction associated with the movie ticket(s), etc. In another exemplary, non-limiting embodiment, a list of available rewards 142 can be forwarded, e.g., via reward generator component 138, to reward component 120 for presentation on device 110, to facilitate selection of a reward 142 at the device 110.

It is to be appreciated that operation of the message control system (e.g., messaging component 115) can be configured at any time, e.g., on the fly. For example, the child may not have performed a desired activity, e.g., washed the dishes, and hence, as punishment, the parent reconfigures the number of messages to be sent to a lower number thus requiring the child to answer more questions for a given number of messages to be sent than when the punishment is not being applied. In an exemplary, non-limiting embodiment, configuration component 150 may be operating on the parent's device (not shown) and thus the configuration settings (e.g., any of message number 151, question categories 152, timing 153, reward 154, etc.) can be adjusted at any time by the parent. As shown in FIG. 2, via arrow W, a reward 142 (or plurality of rewards 242) can be presented on the test display component 119.

While the various embodiments presented herein pertain to controlling operation of messaging from a device (e.g., device 110) a situation may occur where the ability to message is locked on device 110 but the operator needs to send a message, i.e., in a time of emergency. To facilitate such operation, a 'bypass' mode of operation can be enabled, whereby the operator is able to operate device 110 in such a manner that in effect the message control system (e.g., messaging component 115) is de-activated. Hence, the operator of the device 110 is able to transmit messages even though they may currently be in a situation that under normal use (e.g., non-'bypass' mode use) they would not be able to send any messages. In an exemplary, non-limiting embodiment, a tally can be kept (e.g., by message count component 117) of the number of messages that have been sent in 'bypass' mode. The parent of the child can be notified of the number of 'bypass' mode messages that have been sent (e.g., as Bypassed feedback 390 on configuration component 150, FIG. 3) and based upon the number of bypasses, in accord with a situation of operation (e.g., in an emergency) subsequent configuration of the device with regard to message generation can be configured at configuration component 150. For example, the number of messages which can be sent prior to a test being presented can be increased such that the operator does not have to go into 'bypass' mode as often, as shown in FIG. 3.

In another aspect, to facilitate compliance with any standards controlling operation and availability of a device (e.g., Enhanced 911, E911, and the like) the message control system (e.g., messaging component 115) can be configured such that an emergency message can always be sent via the device no matter what the operational state of the message control system (e.g., messaging component 115) is in. A tally (e.g., compiled by message count component 117, message controller 130, etc.) of the number of emergency messages 295 can be reported via the configuration component 150 to facilitate review of usage of device 110.

In another aspect, the operation of the message control system (e.g., messaging component 115) can be configured such that it is only in operation during a particular part of the day. For example, the message control system can be configured to be in operation during non-school hours and not in operation during school hours, and vice-versa, etc.

It is to be appreciated that while the various components comprising system 100 are depicted in various exemplary, non-limiting embodiments, component placement can be at any location within system 100 to facilitate operation of the various embodiments presented herein. For example, while message controller 130, test generator 135, and data store 140 are shown as being located at the telecommunication network 120, the location of the message controller 130, test generator 135 and data store 140 can be at any suitable location within the system depicted in FIG. 1. For example, message controller 130 and/or test generator 135 can be located on device 110 and control operation of device 110 in a local manner. In another example, data store 140 can be located on the device 110, whereby questions are drawn locally from the data store with new questions/batches of questions being available for download to device 110 from telecommunication network 120, for example. In another example, the configuration component 150 can be located on device 110 to facilitate configuration of the count set component 151 and/or test set component 152 to enable operation of the various embodiments presented herein by the operator of device 110, e.g., in a situation where the operator of device 110 is using the embodiments presented herein to present questions (e.g., trivia, self-study such as MCAT, LSAT, SAT, etc.) on their device 110, as previously described.

Figure 4:
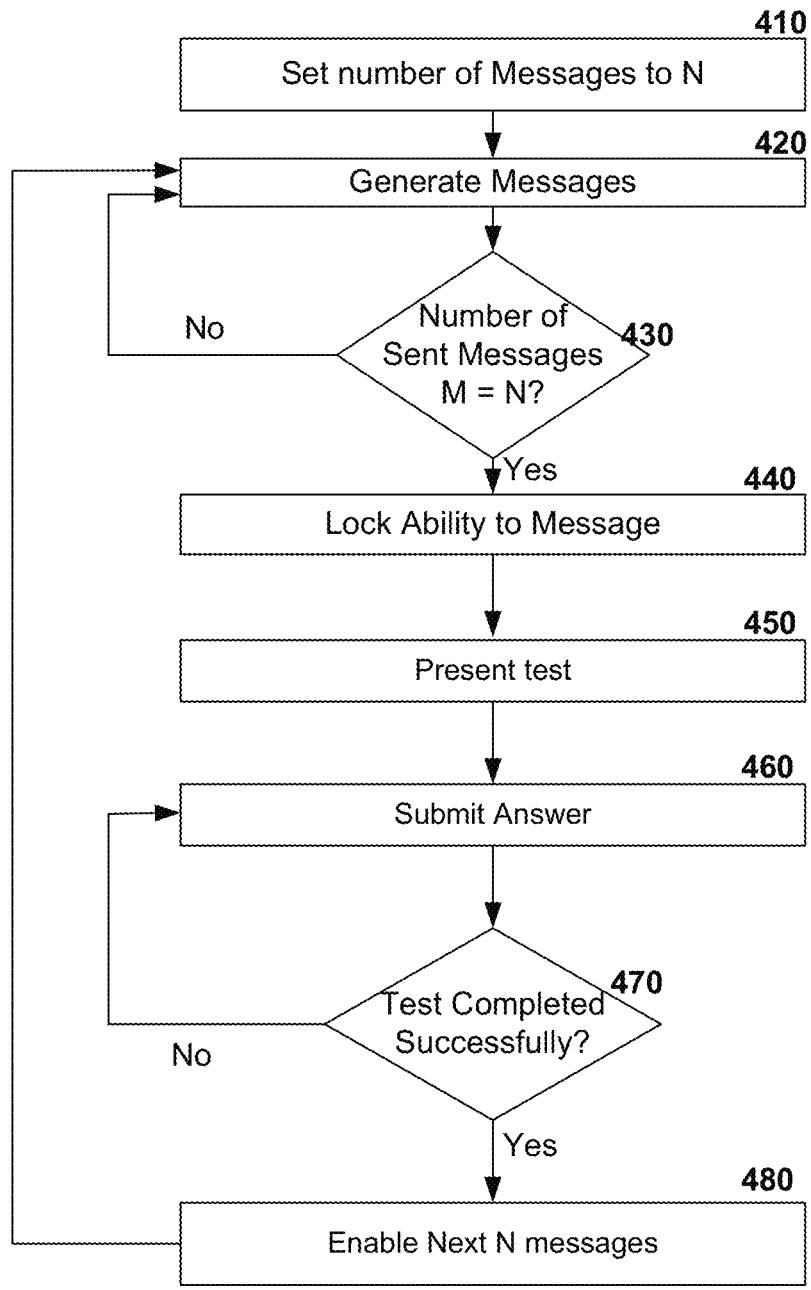
FIG. 4 illustrates a flow for controlling messaging in accordance with one or more embodiments of the subject disclosure.

FIG. 4 depicts a flow diagram illustrating an exemplary, non-limiting embodiment for controlling ability to message from a device in accordance with a determined number of messages. The embodiment of FIG. 4 can be utilized by the system 100 illustrated in FIG. 1 to facilitate presentation of a test to control a number of messages being sent by a device (e.g., device 110). At 410, a number of messages which can be sent before messaging is deactivated and a test (e.g., question 141, 250, etc.) is displayed (e.g., via test display component 119) is configured (e.g., via configuration component 150, count set component 151, etc.). For example, N messages can be sent before messaging is deactivated, where N is a positive integer greater than zero.

At 420, generation of messages is commenced (e.g., via device 110).

At 430 a tally M is maintained (e.g., by any of message count 117, messaging component 115, message controller 130, etc.) of the number of messages generated, with a check being performed at 430 of 'Do the number of messages M sent equal the number of messages N which can be sent before which messaging is deactivated and a test question presented?' In the event of the number of sent messages M not equaling N then the flow returns to 420 for subsequent generation of the next message. In the event of the number of sent messages M equaling N then the ability to send messages is locked (i.e., messaging by messaging component 115 is de-activated) at 440.

At 450, a test question (e.g., question 141, 250) is presented on the device (e.g., device 110 via test display component 119).

At 460, a response (e.g., any of 252, 254, 256, 258) to the question is submitted.

At 470, a determination is made as to whether the response submitted at 460 is the correct response. If the response is incorrect then the flow returns to 460 for subsequent entry of a response. If the response is correct then the flow continues to 480.

At 480, the ability to send a message (e.g., message 101) is reactivated and a next group of N messages is able to be sent as the flow returns to 420.

Figure 5:
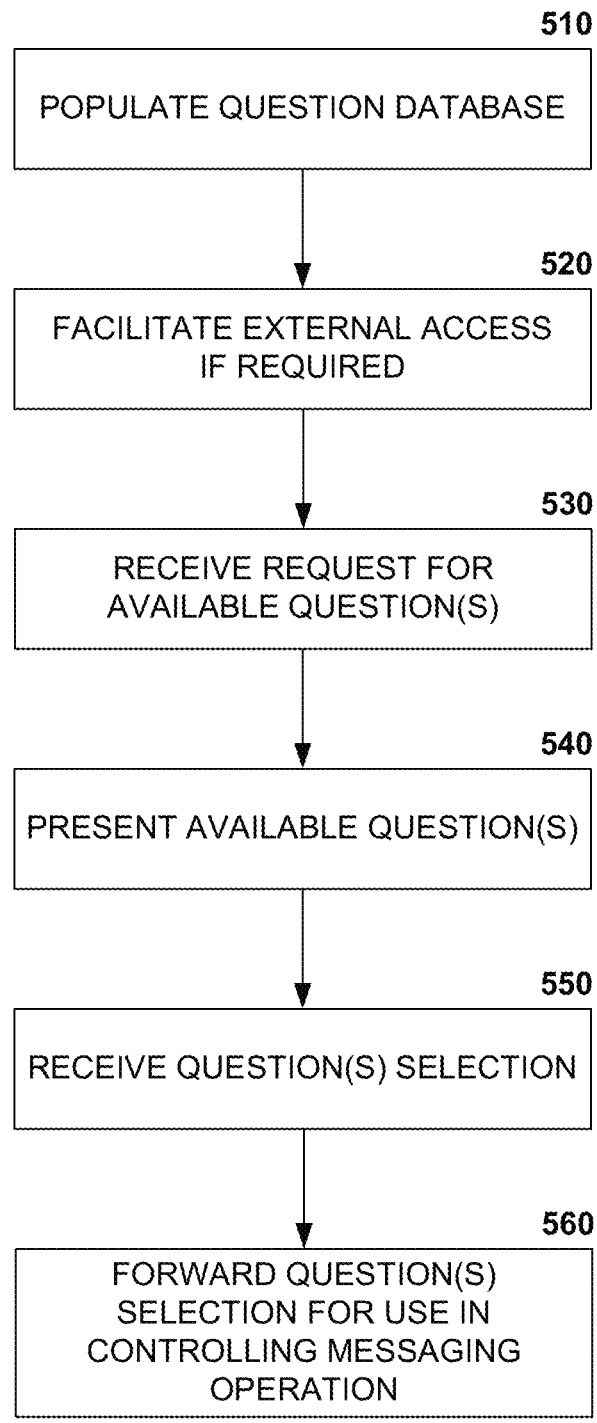
FIG. 5 illustrates a flow for question population and presentment in accordance with one or more embodiments of the subject disclosure.

FIG. 5 depicts a flow diagram illustrating an exemplary, non-limiting embodiment for population and presentation of questions for a message control system. The embodiment of FIG. 5 can be utilized by system 100 illustrated in FIG. 1 to facilitate presentation of questions on a device (e.g., device 110). At 510, a database (e.g., a database in data store 140) can be developed comprising a plurality of questions (e.g., questions 141) which are available for presentation on the device.

Any suitable means for populating the data store can be employed, for example, storing a plurality of questions in the data store by a database administrator (or the like), such as questions comprising an 8$^{th}$ grade education syllabus, questions comprising an MCAT examination, a SAT examination, or an ACT examination, MENSA, trivia questions, questions for a competition/reward program, etc., where the questions are compiled and stored in the data store.

At 520, in another, exemplary, non-limiting embodiment, external access (e.g., to a person not associated with the data store provider) can be facilitated to enable an entity to populate the data store, with the entity being able to submit questions directly to the data store. For example, the entity can be a teacher (e.g., teacher 160) who populates the data store with questions pertaining to a course of study associated with the teacher (e.g., being taught by the teacher) thereby enabling the operator of the device (e.g., a student of the teacher) to be presented with questions associated with the course of study. Alternatively, the entity may be a third party company (e.g., third party 165, such as an entertainment company) providing questions relating to a product/service they are offering, competition they are associated with, and the like. The third party company providing the product/service, competition, etc., can provide the questions directly, or the questions may be generated by a marketing/advertising company associated with the third party company, wherein the marketing/advertising company generates and/or submits the questions on behalf of the third party company.

At 530, a request can be received for the available questions to be presented for selection by an entity. For example, a request can be generated (e.g., via any of configuration component 150, configuration screen 150A, test set configuration component 152, etc.) for questions stored in the data store to be forwarded (e.g., via test generator component 135) to a configuration device (e.g., a remote computer utilizing configuration component 150).

At 540, the various questions available are presented (e.g., via test set configuration screen 152A) for review. It is to be appreciated that while a plurality of questions may be stored in the data store, a subset or categorized view of questions can be presented (e.g., categories 322, 324, 326, 328) to facilitate ease of viewing and/or selection. Further, any suitable means for question display can be utilized as is known to those of skill in the art and so will not be further described herein. For example, a level of difficulty can be selected (e.g., with slider 329) with questions and question groupings being presented as the level of question difficulty is adjusted from easier to harder, and vice versa.

At 550, a selection of question(s) for presentment on the device is generated. A selection can be made (e.g., via configuration screen 150A and configuration component 150) which is forwarded to a central system (e.g., test generator component 135 operating on telecommunication network 120), with the selected question(s) being retrieved (e.g., by test generator 135) from the data store.

At 560, the selected question(s) can be made available for presentment on the device. For example, a question(s) can be received and stored (e.g., at test generator 135) and subsequently forwarded to the device for presentment upon indication being received (e.g., from message count component 117) that a test question(s) is required (e.g., number of sent messages M=number of set messages N, per FIG. 4). In another exemplary, non-limiting embodiment, a question(s) can be forwarded and stored locally on the device, whereupon, when messaging is de-activated and a question is required for presentment, the question can be retrieved from a local storage device (not shown) associated with device 110.

Figure 6:
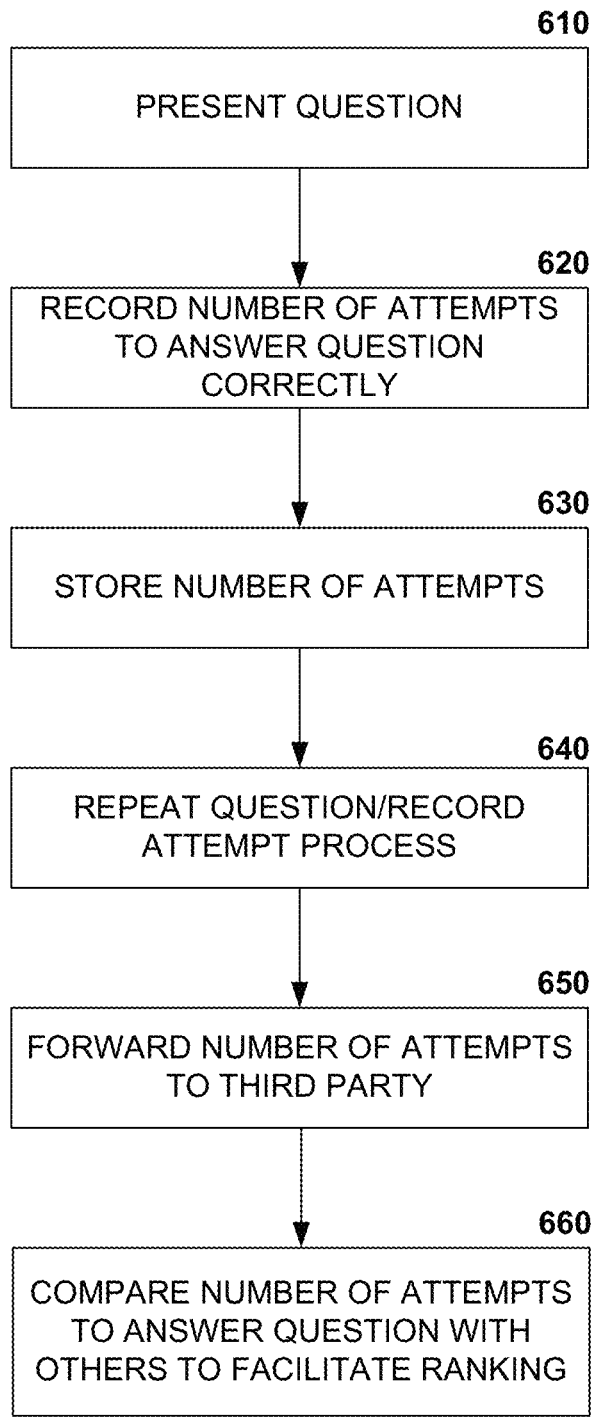
FIG. 6 illustrates a flow for determining and reporting of question attempts in accordance with one or more embodiments of the subject disclosure.

FIG. 6 depicts a flow diagram illustrating an exemplary, non-limiting embodiment for reporting success in correctly satisfying a test requirement, e.g., answering a question correctly. The embodiment of FIG. 6 can be utilized by system 100 illustrated in FIG. 1 to facilitate presentation of questions on a device (e.g., device 110) and recording successful answering thereof. At 610, a question (e.g., question 141, 250) can be presented on the device (e.g., via test display component 119). The question, and subsequent questions can be provided by a third party, where, for example, the questions are being generated to assessment a metric (e.g., intelligence quotient) by which the operator of the device (e.g., a child) can be assessed against a larger population. For example, the third party may be an institution of higher learning which the child wishes to attend and hence the child is being ranked, via the success of answering questions provided by the third party, against other children also wishing to attend the institution.

At 620, the number of attempts to answer the question are recorded. As previously described with regard to FIG. 2, a plurality of answers (e.g., answers 252-258) can be presented along with the pertinent question (e.g., question 250). As each attempt is made to answer the question (e.g., to correctly select the answer from answers 252-258) the number of attempts made can be recorded. For example, if the correct answer is selected on the first attempt, the attempt tally is 1. If the correct answer is not selected until the third attempt, the attempt tally is 3.

At 630, the attempt tally can be stored (either on a storage device local to the device 110, or at a remote storage device).

At 640, acts 610-640 are repeated as needed in accordance with the number of questions to be answered. As each question is answered, the attempt tally for that question can be recorded as well as adding the attempt tally for that question to a total attempt tally for all the questions answered.

At 650, the attempt tally for individual question(s) along with a total attempt tally for all the questions can be reported out (e.g., via report 190) to the third party.

At 660, based on the attempt tallies presented in the report, the assessed metric (e.g., intelligence quotient) can be compared with other children partaking in the test, and based thereon, admission to the institute can be determined. In another exemplary, non-limiting embodiment, the questions can be provided by the child's teacher and hence, based on the attempt tallies, the child can be assessed against other pupils being taught by the teacher. Essentially, the concept of presenting a series of questions, recording the attempt tallies, and reporting the attempt tallies enables an assessment of the person operating the device (e.g., the child) to be assessed/ranked with others taking the same series of questions. As previously described, the questions can be of any suitable subject matter such as a school grade education syllabus, an MCAT examination, a SAT examination, an ACT examination, MENSA, trivia questions, questions for a competition/reward program, etc. Further, while the exemplary, non-limiting embodiment relates to providing assessment via a report (e.g., report 190) to a third party, the report can be forwarded to a person (e.g. the parent of the child) configuring/overseeing usage of the device and operation of the message control system (e.g., messaging component 115) where the report can be provided (e.g., via feedback component 180) to the interested person via a device the interested person is operating in controlling operation of the device (e.g., a remote computer comprising configuration component 150)

Figure 7:
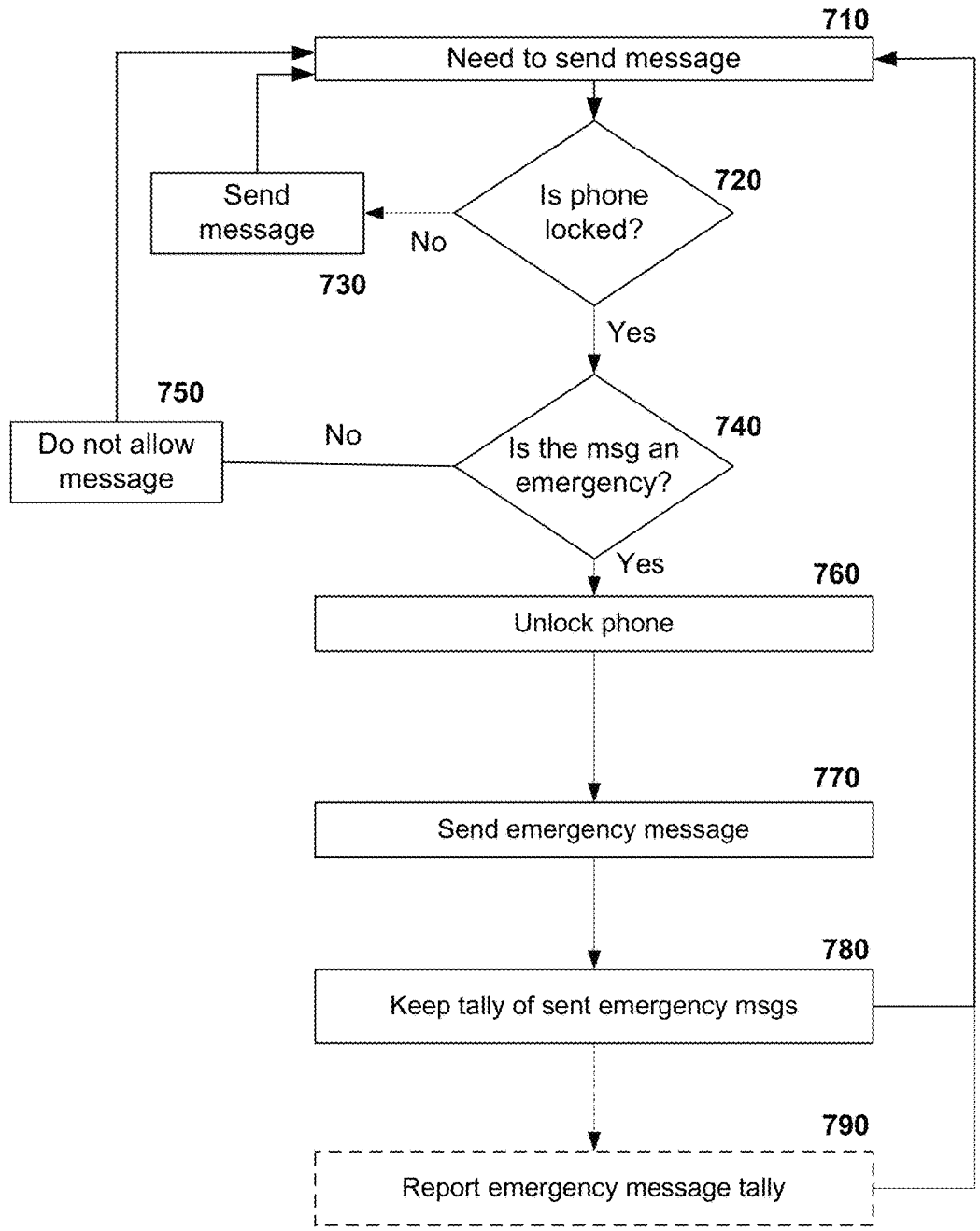
FIG. 7 illustrates a flow for emergency messaging in accordance with one or more embodiments of the subject disclosure.

FIG. 7 depicts a flow diagram illustrating an exemplary, non-limiting embodiment for controlling ability to send a message from a device based on whether the message is an emergency message or not. The embodiment of FIG. 7 can be utilized by the system 100 illustrated in FIG. 1 to facilitate generation and forwarding of an emergency message (e.g., emergency message 295) being sent by a device (e.g., device 110). At 710, there is a requirement for a message (e.g., either message 101 or emergency message 295) to be generated and sent from the device (e.g., device 110).

At 720 a determination is made regarding whether the device is in a 'locked' state and the ability to send a message is currently deactivated (e.g., messaging component 115 is de-activated?), for example, as a result of the number of messages M being previously sent has reached a maximum number N messages (as described in FIG. 4).

At 730, in the event of a determination that the device is not locked, i.e., N>M (e.g., messaging component 115 is active), the message (e.g., message 101) is sent (e.g., from device 110 to any of devices 111, 112, and/or 113), wherein the flow returns to 710 in readiness for a subsequent message to be sent.

At 740, in the event of a determination that the device is locked, i.e., N=M, and no message can currently be sent (e.g., messaging component 115 is de-activated until a question is correctly answered) a determination is made regarding whether the message is an 'emergency' message (e.g., is message a emergency message 295) and the message lock operation is to be 'bypassed'. A means for identifying an emergency message is by an operator selecting an emergency message send component (e.g., EMS button 280) whereupon the subsequently generated message (e.g., emergency message 295) is flagged as being 'emergency'.

At 750, in the event of a determination that the message is not an 'emergency' message (e.g., is not flagged as being an 'emergency' message), transmission of the message is prevented owing to the device being in a locked state, wherein the flow returns to 710. For a non-emergency message to be sent the message transmission functionality of the device needs to be reactivated, as previously described (e.g., with reference to FIG. 4, etc.), before the non-emergency message can be sent.

At 760, in the event of the message being identified as being an 'emergency' message, the message transmission functionality of the device is reactivated (e.g., messaging component 115 is placed in a temporarily activated state) to facilitate transmission of the 'emergency' message. In an exemplary, non-limiting embodiment, the message can be flagged as being an 'emergency' message by any suitable means, such as on a display (e.g., test display 119) displaying a series of questions to be answered a button can be displayed (e.g., emergency message button 280) which upon selection flags the requirement to 'bypass' the question/answer operation (e.g., as presented in FIG. 4) and enable entry and transmission of the emergency message.

At 770, upon generation of the 'emergency' message, the 'emergency' message is transmitted. Subsequent to the message transmission, the ability to send a message from the device returns to the de-activated state (e.g., messaging component 115 returns to a de-activated state) to prevent non-emergency message(s) from being subsequently transmitted.

At 780, a tally (e.g., by message count component 117) can be kept of how many 'emergency' messages are sent, i.e., how often is the question/answer operation 'bypassed' while the ability to send a message(s) from the device is deactivated. After the tally is generated the flow returns to 710 for generation of a subsequent message.

At 790, an 'emergency' message tally report can be generated and forwarded (e.g., to configuration component 150) for viewing by a person administering control of how the device is to operate, e.g., setting the number N messages which can be sent before the messaging system is de-activated. Furthermore, the tally can be displayed on the device to facilitate understanding/analysis of the number of messages sent in 'emergency' and non-emergency mode by the operator of the device. After the tally report is generated the flow returns to 510 for generation of a subsequent message.

Figure 8:
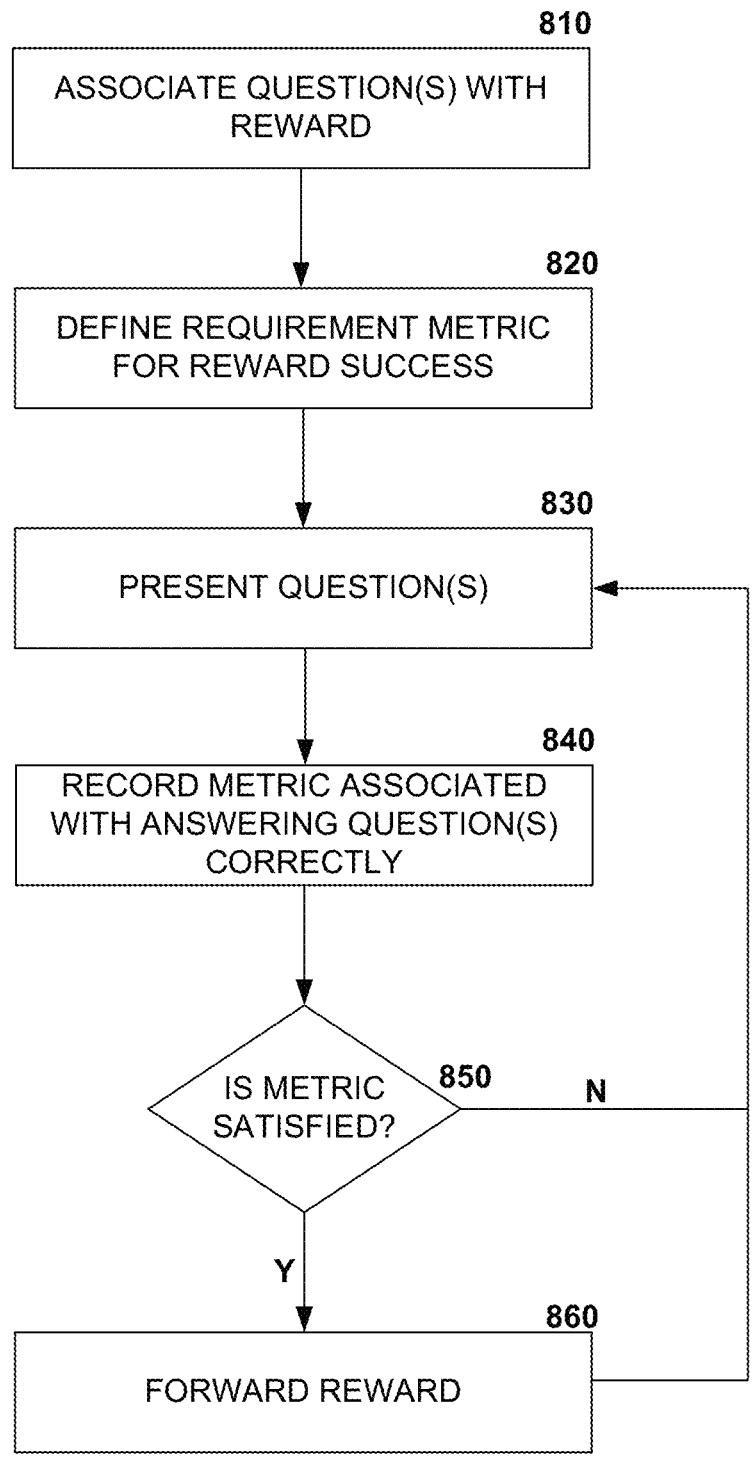
FIG. 8 illustrates a flow for rewarding successful answering in accordance with one or more embodiments of the subject disclosure.

FIG. 8 depicts a flow diagram illustrating an exemplary, non-limiting embodiment for presenting a reward in accordance with successfully answering a question or a series of questions. The embodiment of FIG. 8 can be utilized by system 100 illustrated in FIG. 1 to facilitate generation and forwarding of a reward (e.g., reward 142, 242) to a device (e.g., device 110). At 810, a question (e.g., question 141), or a series of questions, can be associated with a reward(s) (e.g., rewards 142, 242). For example, an association can be made such that upon successful answering of X number of questions, where X is a positive integer, a reward can be made available to the operator (e.g., the child) of the device. In another exemplary, non-limiting embodiment, a reward can be associated with a level of success in answering a question(s), for example, the child maintains an 85% rate of successfully answering a question(s) in a first attempt and a 98% rate of success in answering the question(s) in 2 attempts or less. In another example, a question may be presented for a given period of time, whereby a reward is generated in response to the child successfully answering the question within a predefined period of time from presentment (e.g., via test display component 119) of the question on the device (where reward component 120 comprises a counter to measure the time taken to answer the question).

The association of a reward to a question or series of questions can be performed by the person administering (e.g., the child's parent) operation of the message control system (e.g., via configuration component 150) where the person can select a reward(s) from a list of available rewards (e.g., rewards 142, rewards 362). As previously described, the reward(s) can comprise of any suitable commodity, for example, a concert ticket(s), a theatre ticket(s), a movie ticket(s), a music download(s), a redeemable coupon(s), and the like. The reward may also be provided by a third party (e.g., third party 165), where the third party can provide the question(s) along with the rewards, or simply just the rewards to be subsequently associated with any stored questions (e.g., questions 142 stored in data store 140). For example, as previously described, the third party may be attempting to advertise a new album release by a particular performer (e.g., singer, band, etc.) and hence provides a series of questions (e.g., populates database in data store 140) accompanied by an associated reward(s) of a music download pertaining to a musical album associated with the performer being advertised.

At 820, a particular requirement for success can be defined. For example, the child must answer 8 out of 10 questions correctly with a maximum of two attempts per question (where attempt tallies can be provided in accord with the description of FIG. 6, for example).

At 830, the question(s) having associated rewards are presented.

At 840, a metric associated with answering the question(s) can be recorded (e.g., as described previously with reference to FIG. 6). In an exemplary, non-limiting embodiment, the metric can simply be an answer to a question, a series of answers to a series of questions, or a % of answering a particular number of questions correctly. In another exemplary, non-limiting embodiment, a time requirement can be placed on answering the question(s) within a given time period. In another exemplary, non-limiting embodiment, a minimum number of attempts to answer the question(s) can be defined.

At 850, the recorded values (e.g., number of questions answered, % of questions answered, time to answer question(s) average time to answer question(s), number of attempt(s) to answer question(s), etc.) can be assessed against the predefined metric. If the recorded value (e.g., attempt tally) does not satisfy the predefined metric, flow returns to 830 for presentment of a new question or series of question(s).

If the recorded metric (e.g., average minimum time to answer correctly) meets the predefined metric a reward can be presented (e.g., via test display component 119) on the device, whereupon the child can select the reward, or select a reward from a plurality of available rewards. Per the above example, the child is able to access the music download as their reward.

Figure 9:
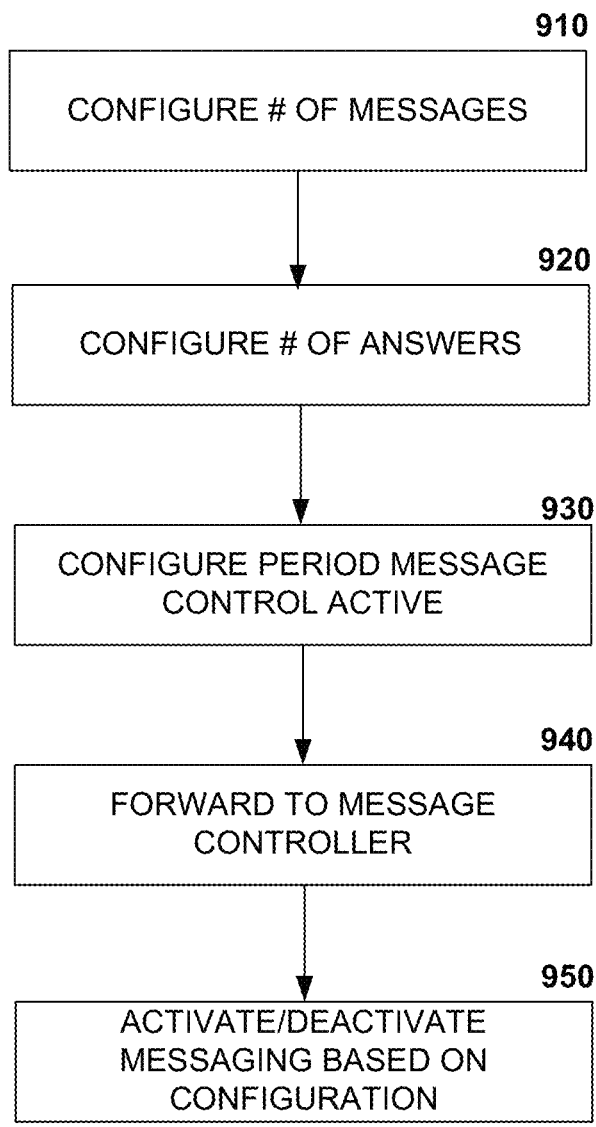
FIG. 9 illustrates a flow for controlling presentment of questions/answers in accordance with one or more embodiments of the subject disclosure.

FIG. 9 depicts a flow diagram illustrating an exemplary, non-limiting embodiment for configuring operation of a message control system. The embodiment of FIG. 9 can be utilized by system 100 illustrated in FIG. 1 to facilitate configuration and operation of a message control system (e.g., messaging controller 115) on a device (e.g., device 110). At 910, a number of messages that can be sent (e.g., number of messages N as described in FIG. 4) before messaging from the device is de-activated is defined (e.g., via any of 310, 312, 314, 316 of count set configuration screen 151A and count set configuration component 151).

At 920, a number of questions to be answered can be defined (e.g., via 317 of count set configuration screen 151A and count set configuration component 151). In a simple operation, the number of questions is one, whereby after a number of messages (e.g., number of messages M as described in FIG. 4) transmitted from device equals a predefined number of messages (e.g., number of messages N) a single question (e.g., question 141, 250) can be presented to be answered, whereupon, as previously described, once the question is successfully answered the ability to send further messages from the device is re-activated. Alternatively, a value (e.g., positive integer greater than 1) can be defined (e.g., via 317 of count set configuration screen 151A and count set configuration component 151) such that a plurality of questions have to be successfully answered to facilitate re-activation of messaging from the device.

At 930, a time of operation of the message control system can be defined (e.g., via 340 of timing set configuration screen 153A and timing set configuration component 153). In a simple configuration (e.g., setting 340 of timing set configuration screen 153A is selected) the timing can be set such that the message control system (e.g., messaging component 115) is in operation at all times and whenever a predefined number of messages (e.g., number of messages N) have been sent, the operator of the device (e.g., a child) has to successfully answer a question before messaging from the device is re-activated. In another configuration (e.g., settings 342 are entered on timing set configuration screen 153A) a time period can be selected, as previously described, such as the hours correlating to school hours, e.g., 8 AM to 3.30 PM.

At 940, the settings are forwarded (e.g., from configuration component 150) to the device (e.g., either directly where the configuration component 150 and device 110 are directly communicatively coupled, or via telecommunication network 120/message controller 130 when the configuration component 150 and device 110 are not communicatively coupled directly).

At 950, operation of the message control system can be controlled based in part on the number of message(s), number of answer(s), and timing of operation configuration settings forwarded (e.g., from configuration component 130)

to the device (e.g., messaging component 115), where the forwarded settings can be utilized to control activation/deactivation of messaging by the device, as previously described.

Figure 10:
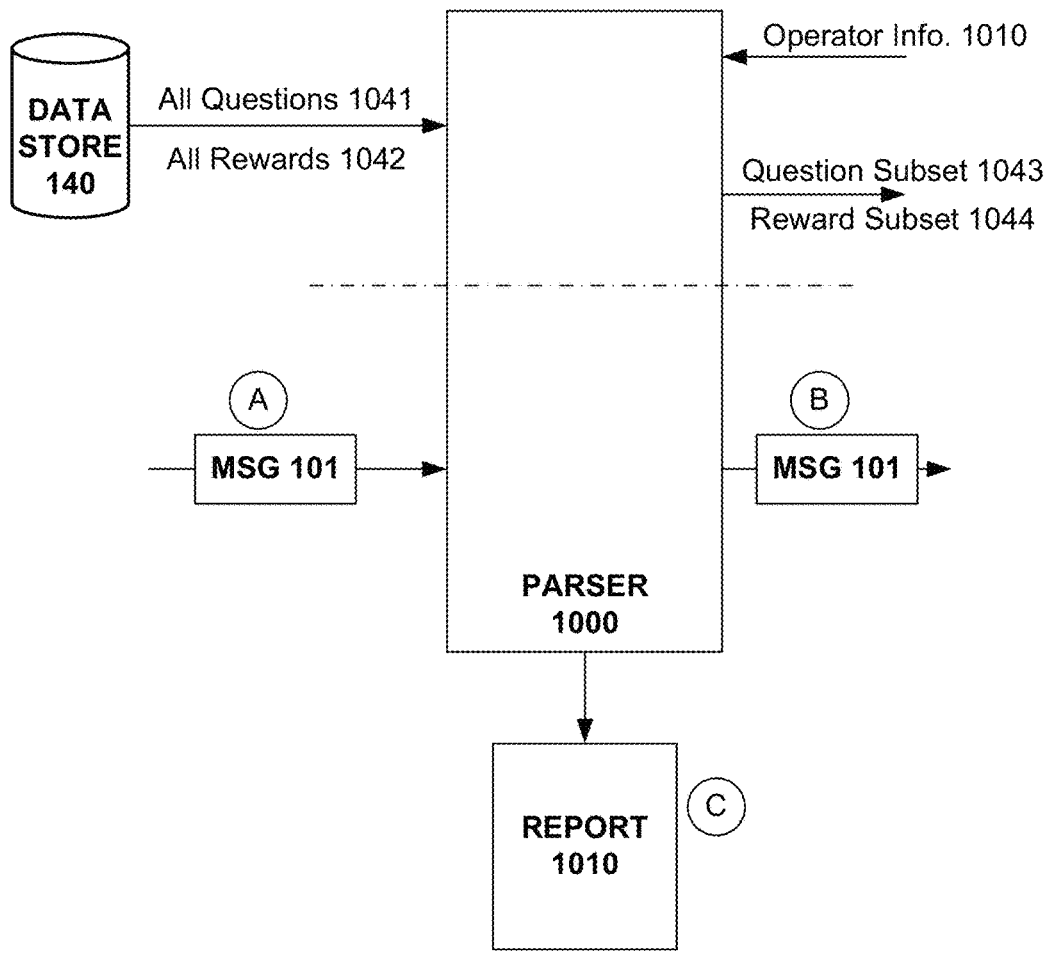
FIG. 10 is a block diagram illustrating exemplary, non-limiting embodiments for message parsing.

FIG. 10 illustrates an exemplary, non-limiting embodiment for parsing messages and other items during message control and reward presentment. A parsing component 1000 can be utilized to parse the content of a message 101, where the parsing component 1000 can be located at any suitable location (e.g., at device 110, at the telecommunications network 120, etc.) to facilitate parsing of a message to be sent by device 110. As shown in FIG. 10, at A, a message 101 can be in the process of being transmitted from the device (e.g., to any of devices 111, 112, and/or 113), however, prior to transmission, the message can be parsed to ascertain the content of the message 101. During parsing, if the message is found to contain a word, term, phrase, etc., deemed unacceptable for sending (e.g., the message contains pornographic terminology, aka., sexting) then system 100 can be configured in a number of ways. In a first configuration, the message 101 is sent, per B, but the ability to send a further message (e.g., via message controller 115) is temporarily halted and the operator of the device (e.g., a child) has to successfully answer one or more questions (e.g., questions 141, 250) before the ability to generate and send a text message is re-invoked. Further, per C, the administrator of the account (e.g., the child's parent) can be sent an indication (e.g., report 1010) that an inappropriate message has been sent (e.g., via configuration component 150). In another embodiment, based on a configuration setting, if message 101 is flagged to contain inappropriate content, the message is not sent, and the child has to answer one or more questions before messaging is re-activated, and a subsequent message can be sent.

In an alternatively, exemplary, non-limiting embodiment, parser component 1000 can be utilized to determine which question(s) and reward(s) should be made available for presentment on a device (e.g., device 110). As previously described, datastore 140 can comprise of a plurality of questions (e.g., questions 141) pertaining to a plurality of different subjects, interests, levels of difficulty, etc. Further, datastore 140 can comprise a plurality of rewards (e.g., rewards 142) which are available for presentment on the device. As previously described, rewards 142 can be presented via reward set configuration component 154 (and reward set configuration screen 154A), however the number of rewards available for presentment may be overwhelming and the operator (e.g., the child's parent) of configuration component 150 is unable to devote an appropriate amount of time to review the rewards available and select which are to be made available on the device, per the acts described with reference to FIG. 8. By utilizing a parsing component 1000, all of the available questions 1041 and all of the available rewards 1042 can be submitted to the parsing component 1000 along with information 1010 pertaining to the operator of the device, for example, information pertaining to the child. Such information can comprise information that is suitable for dissemination to a third party (e.g., from the parent to the operator of the telecommunication network 120) and can include such parameters as age, sex, interest(s), location, previously answered question(s), previously selected reward(s), etc. By reviewing the questions 1041 and/or rewards 1042 using the information provided to parser component 1000, a subset of questions 1043 and/or a subset of rewards 1044 can be made available for selection by the parent, e.g., at configuration component 150, and thus, the number of questions and/or rewards available may be significantly reduced to an amount that the parent is able to review and select from.

Figure 11:
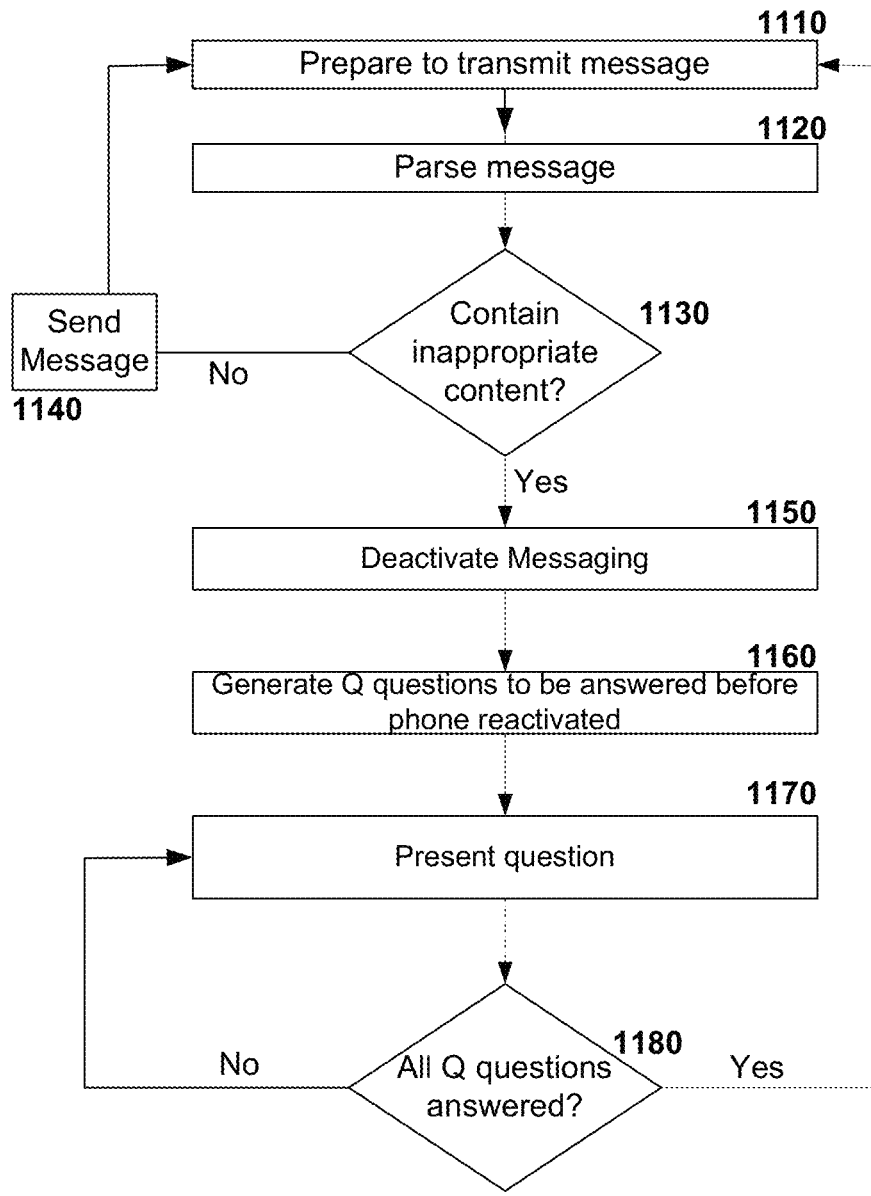
FIG. 11 illustrates a flow for message parsing in accordance with one or more embodiments of the subject disclosure.

FIG. 11 depicts a flow diagram illustrating an exemplary, non-limiting embodiment for parsing a message being transmitted from a device. At 1110 a message (e.g., message 101) is ready for transmission from a device (e.g., phone 110).

At 1120, rather than sending the message (per message 101 depicted in FIG. 1) the message is forwarded to a parsing component (e.g., parsing component 1000) where the message is parsed to determine if the message contains inappropriate content, e.g., sexting, as previously described with reference to FIG. 10.

At 1130, in the event that the message does not contain inappropriate content, the flow advances to 1140 where the message is sent and subsequent flow returns to 1110 for generation/transmission of a subsequent message.

In the event that the message is determined to contain inappropriate content the flow advances to 1150 where the ability to send a message is halted (e.g., messaging component 115 is temporarily de-activated for the transmission of messages).

At 1160, at least one question, Q, is generated to be successfully answered before messaging from the device is re-activated.

At 1170, the at least one question is presented (e.g., via test display component 119) to be answered.

At 1180, a determination is made regarding whether all of the questions have been answered. In the event that not all questions have been answered, flow returns to 1170 for a subsequent answer to be displayed, with flow then proceeding once more to 1180. In the event of all the question(s) being successfully answered, the flow returns to 1110 for preparation of transmission of a subsequent message. In an aspect, a requirement can be placed upon the success of answering such that, rather than the child being able to select all answers in rapid succession until the correct answer is selected, if the child does not answer the question correctly within the first two attempts, the question can be deemed to have been answered incorrectly and a subsequent question is presented which also has the requirement of a successful answer being selected within a given number of attempts. It is to be appreciated that the operation of having a requirement to answer a question within a given number of attempts, and where the number of attempts are exceeded the question is deemed to have been incorrectly answered is applicable to any of the exemplary, non-limiting embodiments presented herein.

Figure 12:
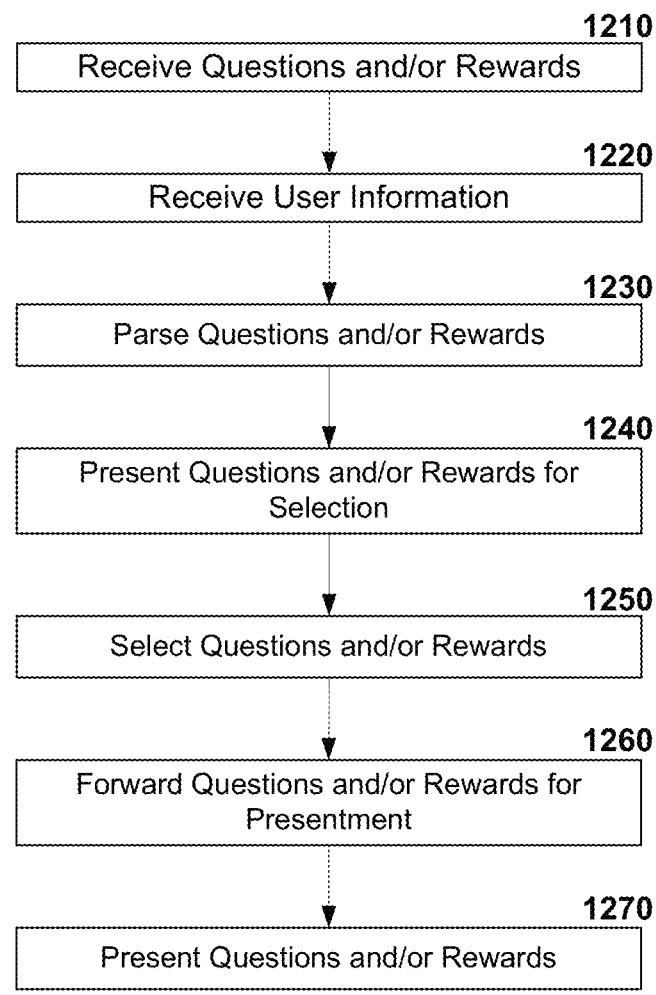
FIG. 12 illustrates a flow for parsing of questions and or rewards in accordance with one or more embodiments of the subject disclosure.

FIG. 12 depicts a flow diagram illustrating an exemplary, non-limiting embodiment for parsing a set of available questions or rewards for presentment on a device. At 1210, a plurality of questions (e.g., questions 141, 1041) and/or rewards (e.g., rewards 142, 1042) are retrieved from a datastore (e.g., datastore 140). The questions can pertain to a plurality of different subjects, interests, levels of difficulty, etc. Further, the rewards can comprise of a plurality of rewards, e.g., a concert ticket(s), a theatre ticket(s), movie ticket(s), a music download, a redeemable coupon, and the like, and stored in electronic format in the data store. Hence, the various questions and/or rewards may not be of interest to an operator of the device. In a mode of operation, the child's parent may be selecting which questions and/or rewards to be presented on the device and thus the parent may prefer to select from questions and/or rewards that pertain to their child. The questions and/or rewards received can be submitted into a parser component (e.g., parser component 1000) to facilitate selection of desired questions and/or rewards.

At 1220, user information (e.g., user information 1010) can be received at the parser component, where the user information pertains to the operator of the device, e.g., the child. Such information can include such parameters as age, sex, interest(s), location, previously answered question(s), previously selected reward(s), etc.

At 1230, the set of questions (e.g., all questions 1041) and/or the set of rewards (e.g., all rewards 1042) can be parsed with regard to the user information, where the parsing operation can involve comparing keywords contained in the user information with keywords, categories, etc., associated with or comprising the questions and/or rewards.

At 1240, any matches between the user information and the questions and/or rewards can be presented to the parent (e.g., via any of configuration component 150, test set configuration component 152, test set configuration screen 152A, reward set configuration component 154, reward set configuration screen 154A, etc.) for review, where the questions can be a subset (e.g., question subset 1043) of all the questions available and the rewards can be a subset (e.g., reward subset 1044) of all the rewards available.

At 1250, from the presented question subset and/or reward subset the parent selects which questions and/or rewards are to be presented on the device.

At 1260, the selected questions and/or rewards are retrieved for presentment on the device.

At 1270, the selected questions and/or rewards are presented on the device. In a situation where a series of questions have been selected, each question can be presented in accordance with the stepped approach of message(s)-question(s)-message(s) as presented herein. Regarding the various selected rewards, any suitable method of display (e.g., on test display component 119) can be utilized, e.g., a tiled display of rewards, a scrollable list, etc.

In a further exemplary, non-limiting embodiment, the concept of controlling operation of a device based upon the presentation of a task and subsequent completion of the task is not limited to controlling operation of messaging from a device (e.g., a cellular phone) with any other suitable application is considered with the scope of the various embodiments presented herein regarding controlling operation of other devices. For example, a question/answer operation can be utilized to control operation of television viewing (e.g., 20 minutes, half hour, an hour, etc.) where correctly answering a question effectively unlocks each period of viewing time. In another example, the question/answer operation can be utilized to control the amount of time a person spends playing a computer game, video game, online game, or other pursuit, whereby a test question can be presented to facilitate further game play (e.g., on any applicable system such as a computer, mobile device, laptop, video game console, X-BOX, PLAYSTATION, WII, interactive television, and the like).

Figure 13:
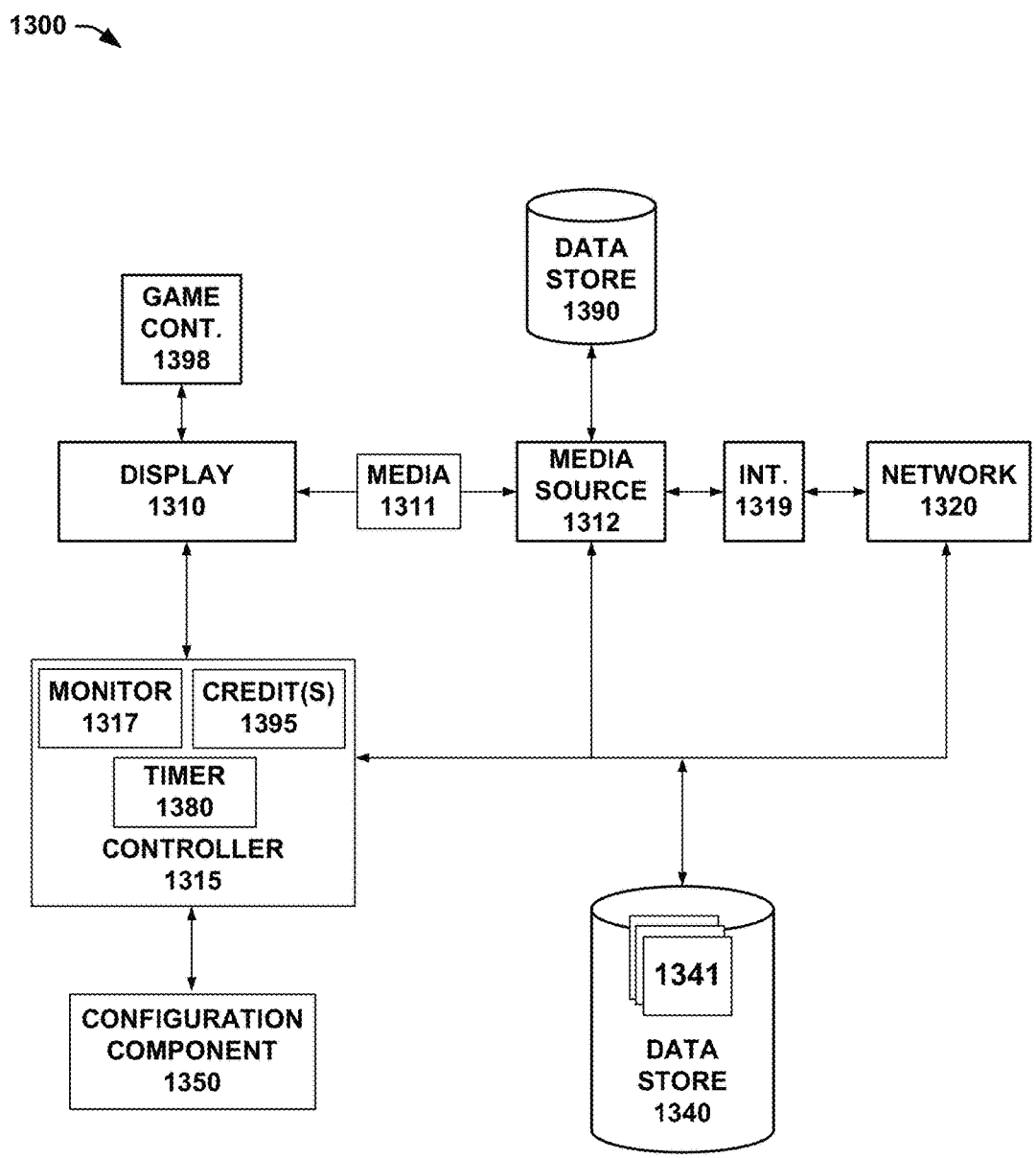
FIG. 13 is a block diagram illustrating exemplary, non-limiting embodiments for controlling media presentation and/or gameplay.

An exemplary, non-limiting embodiment is shown in FIG. 13, comprising a display, a data source, and other components to facilitate control of a television, computer game, and the like. A display 1310 (e.g., a television, computer monitor, display of a portable device such as a cellular phone, tablet pc, and the like) is connected to a media source 1312. In an embodiment where control of television is being undertaken, media source 1312 can be any suitable source for media 1311 for display on display 1310, where media source 1312 can comprise of an optical disk storage (e.g., DVD, compact disc, Laserdisc, and the like), media storage such as a portable memory (e.g., Universal Serial Bus (USB), CompactFlash, and the like), a digital media storage drive, video tape (e.g., VHS, BETAMAX, and the like), a digital video recorder (e.g., TIVO). In another embodiment, content for presentation on display 1310 can be provided by a remote source such a telecommunication network 1320 (e.g., a television network, cable television network, satellite television network, internet television network, etc.) where such media content 1311 can be received at display 1310 via an interface 1319. Interface 1319 can comprise of any required components to facilitate receipt, decoding, encoding, transmission, etc., as required for the media content 1311 such as adapters, internet modems, CABLECARD, M-CARD, antenna systems, and the like as is known to those of skill in the art and so will not be further described herein.

Further associated with display 1310 is a control component 1315, which is utilized to control a period for which media 1311 presented on display 1310 can be viewed (e.g., how long a television program can be viewed) by a person (e.g., any entity, where continuing the previous example, such as a child). Controller 1315 comprises components necessary to monitor a period of viewing on display 1310 and once a defined period of viewing has expired, presentation of media 1311 on display 1310 is temporarily halted while a task (e.g., a question) is to be successfully completed. Such components can comprise a monitoring component 1317 which can be utilized to monitor operation of display 1310. A timer component 1380 can be utilized to determine how much time the display 1310 has been presenting media 1311 and upon expiration of a predefined amount of time, monitoring component 1317 can temporarily halt presentation of media 1311, while a question(s) 1341 is retrieved from storage device 1340. Upon correctly answering question 1341 the monitoring component 1317 facilitates further viewing of media 1311 on display 1310 until the next predefined amount of time has expired. Owing to media 1311 being received from an external source such as telecommunication network 1320 a situation may occur such that the received media content 1311 has to be cached (e.g., in storage device 1390) while the question 1341 is being answered. Similar to the previously presented embodiments regarding control of messaging on a device, a configuration component 1350 can be utilized to perform such operations as setting a 'time to view' period during which media content 1311 can be viewed on display 1310, question(s) 1341 to be presented, etc. However, for the sake of brevity and presentation, rather than detailing the operation of each and every component in terms of how it relates to presentation and control of media on a display the various concepts pertaining to control of messaging on a device can be equally applied to the various embodiments presented herein regarding presentation of media 1311 on display 1310. To facilitate uninterrupted viewing of media content 1311 which includes portions of content which the viewer may not be interested in (e.g., commercial breaks) the presentation of a question can be configured to coincide with presentation of a commercial. Further, viewing credits can be accrued whereby prior to viewing desired media content 1311, the viewer can answer one or more questions to accrue a desired amount of viewing time. For example, a plurality of questions 1341 can be answered where each answer is 'worth' 30 minutes of viewing time, and hence to obtain 2 hours of viewing time 4 questions 1341 are to be correctly answered to obtain 4 credits 1395 thereby enabling 2 hours of uninterrupted viewing of media content 1311. In another exemplary, non-limiting embodiment, credit(s) 1395 can be obtained based upon the viewing content or time of viewing.

For example, a child wishes to stay up later into the evening to watch a particular media content 1311 (e.g., a movie) and hence has to earn more credits 1395 for viewing of the late night media content 1311 than for an equivalent viewing period that is earlier in the day. In another example, the child could be required to earn more credits to watch a given period of time for a first media content (e.g., a sporting event) than for a same given period of time for a second media content (e.g., a science program).

In an exemplary, non-limiting embodiment, similar operation to that presented above can be similarly applied to playing of video games, pc games, internet based games, etc., where gameplay is enabled for a predefined amount of time upon which a task has to be successfully completed before gameplay can continue. A game controller 1398 (e.g., a joystick or similar interactive device) can be utilized in conjunction with display 1310 and media source 1312 to form a gaming system, where media 1311 can be a game. Media 1311 can be provided by media source 1312 (e.g., a gaming console, digital media source, and the like) or via a feed such as the internet or other suitable delivery system from a remote network 1320 providing digital gaming content. In such a system, media source 1312 can be similar to the system relating to viewing time previously mentioned, where it is possible to accrue playing credits 1395 to enable uninterrupted playing of a game, for example, when playing in a live online scenario against other players. Such accrual of credits 1395 can be similarly applied to system 100 where a number of credits 1395 can be obtained thereby enabling a number of messages to be sent before further credits have to be obtained.

It is to be appreciated that while system 1300 illustrates operation controller component 1315 being separate from any of media source 1312, display 1310, network system 1320, etc., the operation controller component 1315 can be incorporated into any of the components comprising system 1300 (e.g., any of media source 1312, display 1310, network system 1320, etc.) either as an incorporated device, an application, software, etc. The operation controller component 1315 operates in a manner similar to that of messaging component 115, however, rather than controlling operation of a messaging system, operation controller component 1315 controls operation of television viewing (e.g., where display 1310 and media source 1312 comprise an entertainment system) and/or game play (e.g., where display 1310 and media source 1312 comprise a gaming system).

Figure 14:
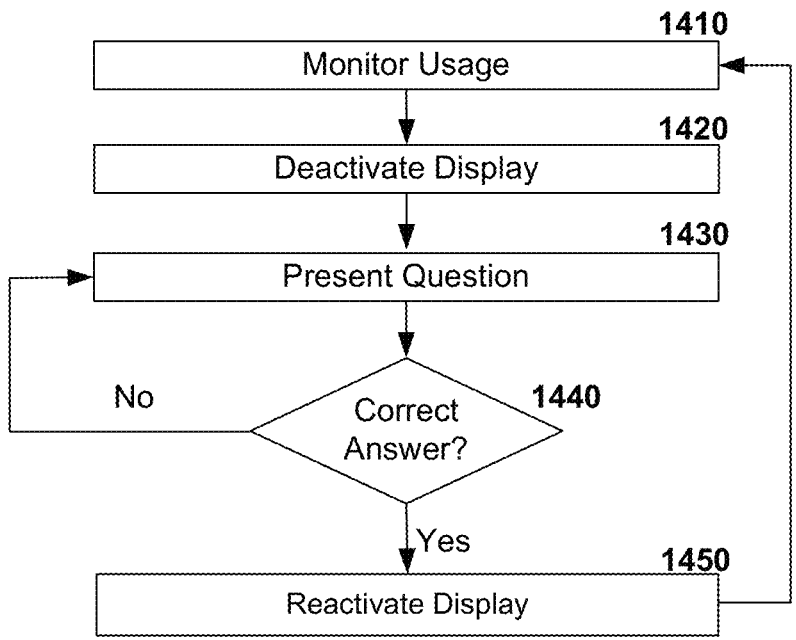
FIG. 14 illustrates a flow for controlling presentation of media and/or gameplay in accordance with one or more embodiments of the subject disclosure.

FIG. 14 depicts a flow diagram illustrating an exemplary, non-limiting embodiment for controlling display of media based on correctly answering a question.

At 1410, usage of a media source (e.g., media source 1312, display 1310, telecommunication network 1320, interface 1319) is monitored (e.g., by monitor component 1317) to determine a viewing period of media (e.g., media 1311) on a display (e.g., display 1310) versus a predefined period of viewing.

At 1420 upon a determination that the viewing period equals the predefined viewing period presentation of the media on the display is temporarily halted.

At 1430 a question (e.g., question 1341) is presented on the display and a determination made regarding whether the answer was correct or not. At 1440 in response to a determination that the question was incorrectly answered the flow returns to 1430 for presentation of another question. At 1440 in response to determination that the question was correctly answered the flow continues to 1450 where presentation of the media content on the display resumes for a further predefined period or until viewing is ceased.

Figure 15:
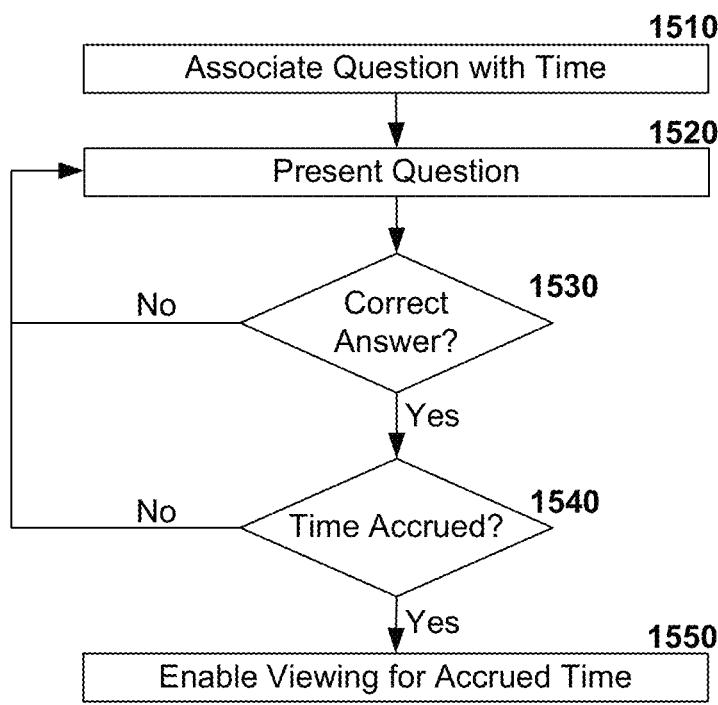
FIG. 15 illustrates a flow for controlling presentation of media and/or gameplay in accordance with one or more embodiments of the subject disclosure.

FIG. 15 depicts a flow diagram illustrating an exemplary, non-limiting embodiment for accruing time for displaying media content based on correctly answering a series of questions.

At 1510 an amount of time is allotted per each question (e.g., question 1341) answered, for example, for each question answered a credit (e.g., credit 1395) of 20 minutes is defined for each question. Hence, for example, if a viewing period of 1 hour is desired 3 questions are to be correctly answered to enable viewing for the 1 hour period. Further, rather than a flat amount of time being available to be accrued for all of the questions, an amount of time can be dependent upon the perceived level of difficulty of the question, where the more difficult the question the more time available to be accrued.

At 1520 a question is presented to be answered.

At 1530 a determination is made regarding whether the supplied answer is correct. In response to the answer being incorrect the flow returns to 1520 for another question to be answered.

At 1540 in response to a determination that the question has been correctly answered at 1530 a determination is made regarding whether the required number of questions have been answered in view of the desired amount of time (e.g., does required amount of time RT=number of questions answered NQ×allotted time per question AQ). If more time (e.g., RT>NQ×AQ) is required the flow returns to 1520 for a further question(s) to be presented. If the required amount of time is accrued (e.g., RT=NQ×AQ) the flow proceeds to 1550 where viewing of the media content (e.g., media 1311) on a display (e.g., display 1310) is facilitated.

As previously mentioned, while the various exemplary, non-limiting embodiments described in the preceding methodologies are presented with regard to media content being displayed on a display, either of the media source 1312 or network 1320 can provide content for gaming purposes where activation/deactivation of the game can be based on answering one or more questions, or a period of game play can be accrued by answering one or more questions to facilitate uninterrupted gameplay for a given amount of time.

In accordance with one or more embodiments and corresponding disclosure, various non-limiting aspects have been described in connection with controlling messaging from a device based upon presentation of one or more tests and successfully providing an answer to the test(s).

In an embodiment, a system is presented comprising plurality of components which can include a memory including at least one computer-executable instruction; a processor configured to execute the at least one computer-executable instruction, wherein in response to execution by the processor, wherein the at least one computer-executable instruction implements components comprising: a messaging component configured to transmit at least one message from the system to a remote device; tally a number of messages transmitted from the system to a remote device; determine whether the number of messages transmitted equals a maximum number of messages to be transmitted; and deactivate, in response to determining the number of messages transmitted equals the maximum number of messages to be transmitted, ability to transmit a subsequent message to the remote device. The system can further comprise a display component, wherein the display component is configured to present, in response to deactivation of message transmission, a question and a plurality of possible answers to the question. The display component can be further configured to receive an answer input from the plurality of possible answers to the question.

In another embodiment, the messaging component can be further configured to determine whether the answer input is a correct answer to the question, and further, in response to determining the answer input is the correct answer, activate ability to transmit a subsequent message to the remote device. Furthermore, the messaging component can be configured to, in response to determining the answer input is the correct answer, generate a reward, wherein the reward can be configured for presentment on the display component. In an embodiment, the reward can be received by the messaging component from a remote network, with the reward being at least one of a ticket, a download, or a coupon.

In a further embodiment, the question and the plurality of possible answers to the question, can be received (e.g., by the messaging component) from a remote network. The remote network can be hosted by a telecommunication service provider for the system.

In an embodiment, the aforementioned system can be a cellular phone.

In another embodiment, a system (e.g., a cellular phone) can be configured for receiving a setting for a maximum number of messages M to be sent, transmitting a number of messages N to a remote device, counting the number of messages N sent, determining whether N=M, and preventing, in response to determining N=M, a subsequent message from being sent. The N messages can be generated in accordance with a short message service (SMS), multimedia messaging service (MMS), enhanced messaging service (EMS), or a text messaging service. Further, the setting for the maximum number of messages M to be sent can be received from a remote device.

In a further embodiment, the system can be configured for presenting a question and a plurality of answers pertaining to the question, receiving an input pertaining to an answer in the plurality of answers, determining whether the inputted answer is a correct answer to the question, and enabling, in response to determining the inputted answer is the correct answer to the question, the ability to send a subsequent message. In a further embodiment, the system can be configured for providing, in response to determining the inputted answer is the correct answer to the question, a reward.

In another embodiment, the system can be configured for presenting a question and a plurality of answers pertaining to the question, receiving an input pertaining to an answer in the plurality of answers, determining whether the inputted answer is a correct answer to the question, and preventing, in response to determining the inputted answer is incorrect answer to the question, the ability to send a subsequent message.

In a further embodiment, a computer readable storage medium (e.g., located on a cellular phone) comprising computer executable instructions can be utilized that, in response to execution cause a computing system including a processor to perform operations comprising any of setting a maximum number of messages that can be sent, counting a number of messages sent, determining whether the number of messages sent equals the maximum number of messages that can be sent, deactivating, in response to determining the number of messages sent being equal to the maximum number of messages that can be sent, an ability to send a subsequent message, presenting a question and a plurality of answers pertaining to the question, receiving an input answer in the plurality of answers, determining whether the input answer is a correct answer to the question, and activating, in response to determining the input answer is the correct answer, the ability to send a subsequent message. In another embodiment, the operations can further comprise receiving the question and the plurality of answers pertaining to the question from a remote device.

Exemplary Computing Device

As mentioned, the techniques described herein can be applied to any system supporting the message/media content/gaming control operations described herein. It can be understood, therefore, that handheld, portable and other computing devices and computing objects of all kinds are contemplated for use in connection with the various embodiments, e.g., control of messaging, presentation of media content, control time of game play. Accordingly, the below general purpose remote computer described below in FIG. 16 is but one example of a computing device, where the computing device can comprise any of the components comprising systems 100 and 1300 such as device 110, configuration component 150, media source 1312, controller 1315, configuration component 1350, etc., as presented above.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 16:
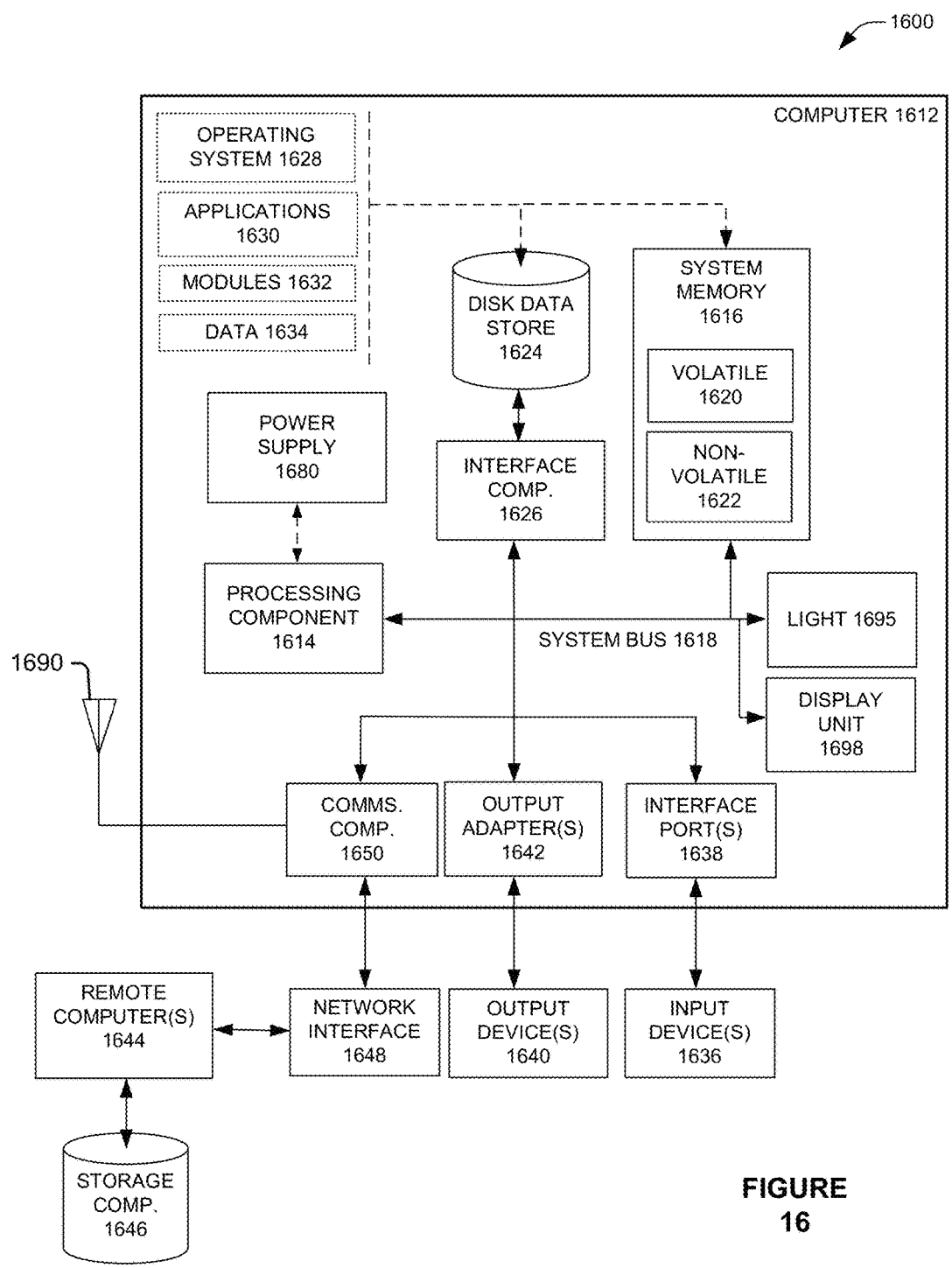
FIG. 16 is a block diagram an exemplary computing environment.

FIG. 16 thus illustrates an example of a suitable computing system environment 1600 in which one or aspects of the embodiments described herein can be implemented, although as made clear above, the computing system environment 1600 is only one example of a suitable computing environment and is not intended to suggest any limitation as to scope of use or functionality. In addition, the computing system environment 1600 is not intended to be interpreted as having any dependency relating to any one or combination of components illustrated in the exemplary computing system environment 1600.

With reference to FIG. 16, an example environment 1600 for implementing various aspects of the aforementioned subject matter, including determining an orientation of a device and effecting a corresponding orientation of an associated oblique plane or slice, includes a computer 1612. The computer 1612 can include any of a processing component 1614, a system memory 1616, and a system bus 1618. System bus 1618 is employed to couple system components comprising environment 1600, including, but not limited to, the system memory 1616 to the processing component 1614. The processing component 1614 can be any of various available processors, including dual microprocessors and other multiprocessor architectures.

System memory 1616 can include volatile memory 1620 and non-volatile memory 1622. In exemplary, non-limiting embodiments, non-volatile memory 1622 can comprise any of read only memory (ROM), programmable ROM (PROM), electrically programmable ROM (EPROM), electrically erasable PROM (EEPROM), or flash memory. In an exemplary, non-limiting embodiment, volatile memory 1620 includes random access memory (RAM), which acts as external cache memory, wherein, a non-exhaustive listing, RAM can comprise of synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The basic input/output system (BIOS), containing the basic routines to transfer information between elements within the computer 1612, such as during start-up, is stored in non-volatile memory 1622.

System bus 1618 can be any of several types of bus structure(s) including the memory bus or memory controller, a peripheral bus or external bus, and/or a local bus using any variety of available bus architectures and, in a non-exhaustive listing can include any of 8-bit bus, VESA Local Bus (VLB), Universal Serial Bus (USB), Extended ISA (EISA), Industrial Standard Architecture (ISA), Micro-Channel Architecture (MSA), Advanced Graphics Port (AGP), Intelligent Drive Electronics (IDE), Peripheral Component Interconnect (PCI), Small Computer Systems Interface (SCSI), and Personal Computer Memory Card International Association bus (PCMCIA).

Computer 1612 can also comprise removable/non-removable, volatile/non-volatile computer storage media, such as, for example, a disk data store 1624. Disk data store 1624 can include, in a non-exhaustive listing, any of a magnetic disk drive, floppy disk drive, tape drive, Jaz drive, Zip drive, LS-100 drive, flash memory card, memory stick, or other device providing comparable functionality. Further, disk data store 1624 can also comprise storage media separately or in combination with other storage media including, in a non-exhaustive listing, an optical disk drive such as a compact disk ROM device (CD-ROM), CD recordable drive (CD-R Drive), CD rewritable drive (CD-RW Drive) or a digital versatile disk ROM drive (DVD-ROM). A removable or non-removable interface, e.g., interface 1626, can be employed to facilitate connection of any of one or more disk data store(s) 1624 to the system bus 1618.

FIG. 16 further presents software which can act as an intermediary between an operator(s) of components comprising environment 1600 and the various components comprising computer system environment 1612. In a non-exhaustive listing, software can comprise any of an operating system 1628, system applications 1630, program modules 1632, and program data 1634 (e.g., data employed to generate 3D representation(s) 110 and 240). Operating system 1628, which can be stored on disk storage 1624, facilitates control and allocation of resources of the computer system 1612. System applications 1630 operate in accord with the management of system resources by operating system 1628 through program modules 1632 and program data 1634 stored either in system memory 1616 or on disk storage 1624. It is to be appreciated that the various embodiments presented herein can be implemented with a variety of, or combination of, operating systems.

Input device(s) 1636, can be employed by an entity to facilitate entry of commands or information into the computer 1612. In a non-exhaustive listing, input devices 1636 can comprise a pointing device such as a mouse, trackball, stylus, touch pad, keyboard, touch screen, microphone, joystick, game pad, satellite dish, scanner, TV tuner card, camera, video camera, web camera, and the like. Further, in an exemplary, non-limiting embodiment, input device 1636 can be keyboard or similar for device 110, game controller 1398, and the like. These and other input devices connect to the processing component 1614 through the system bus 1618 via interface port(s) 1638. In a non-exhaustive listing, interface port(s) 1638 can comprise of a serial port, a parallel port, a game port, and a universal serial bus (USB).

It is to be appreciated that output device(s) 1640 can utilize some of the same type of ports as input device(s) 1636. In an exemplary, non-limiting embodiment, a USB port may be used to provide input to computer 1612, and to output information from computer 1612 to an output device 1640. An output adapter 1642 can be utilized to facilitate communication with particular output devices 1640 like monitors, speakers, and printers, among other output devices 1640, which require special adapters. In a non-exhaustive listing, output adapters 1642 can include video and sound cards provisioning a means of connection between the output device 1640 and the system bus 1618. It is to be appreciated that other devices and/or systems of devices also provide both input and output capabilities such as remote computer(s) 1644. In a non-exhaustive listing, remote computer(s) 1644 can be a personal computer, a tablet PC, a mobile device, a cellular phone, a server, a router, a network PC, a workstation, a microprocessor based appliance, a peer device or other common network node and the like, and can include, some or all of the components (both hardware and software) comprising computer 1612. Information can be transmitted to remote computer(s) 1644, where such information can relate to required questions (e.g., questions 141), answers (e.g., answers 142), configuration data (e.g., received from configuration component 150, configuration component 1350), a message tally (e.g., received from message count component 117), reward information (e.g., received from third party 165, messaging component 115, configuration component 150, controller 1315, configuration component 1350), and the like to facilitate operation of the various exemplary, non-limiting embodiments presented herein, wherein the information can be stored in memory storage component 1646. Further, remote computer(s) 1644 can also provide any information to facilitate control of messaging, question presentation, answer determination, reward presentation, question generation, and the like, wherein any necessary data, e.g., question data, answer data, configuration data, reward data, etc., can be retrieved, or received, from memory storage component 1646, for example where remote computer 1644 is associated with a server system association with a telecommunications network, and the like employed to generate and determine correct answering of questions, tasks, etc.

Computer 1612 can operate in a networked environment utilizing logical connections to one or more remote computers, such as remote computer(s) 1644. Remote computer(s) 1644 can be logically connected to computer 1612 through a network interface 1648 and further can be physically connected via communication component/connection 1650. Network interface 1648 encompasses communication networks such as local-area networks (LAN) and wide-area networks (WAN). In a non-exhaustive listing, LAN technologies include Fiber Distributed Data Interface (FDDI), Copper Distributed Data Interface (CDDI), Ethernet/IEEE 802.3, Token Ring/IEEE 802.5 and the like. In a non-exhaustive listing, WAN technologies include point-to-point links, circuit switching networks like Integrated Services Digital Networks (ISDN) and variations thereon, packet switching networks, and Digital Subscriber Lines (DSL).

Connection of the network interface 1648 to the system bus 1618 is facilitated by hardware/software comprising communication connection(s) 1650. It is to be appreciated that while communication connection(s) 1650 is shown located inside computer 1612, communication connection(s) 1650 can also be located externally to computer 1612. In a non-exhaustive listing, hardware/software comprising communication connection(s) can comprise of internal and external technologies such as, modems including regular telephone grade modems, cable modems and DSL modems, ISDN adapters, and Ethernet cards. Where communications can be by any available means, e.g., in a non-exhaustive listing, wired, wireless, Wi-Fi, IEEE 802.11 (a,b,g,n), BLUETOOTH, RS-232 data, Wi-Fi Direct, WIMAX, Super WIFI, WLAN, radio, etc.

Exemplary Networked and Distributed Environments

One of ordinary skill in the art can appreciate that the various embodiments presented herein for message control applications can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in facilitating incorporation of a device, having a plurality of network configurations, into any supported network as described for various embodiments presented herein.

Figure 17:
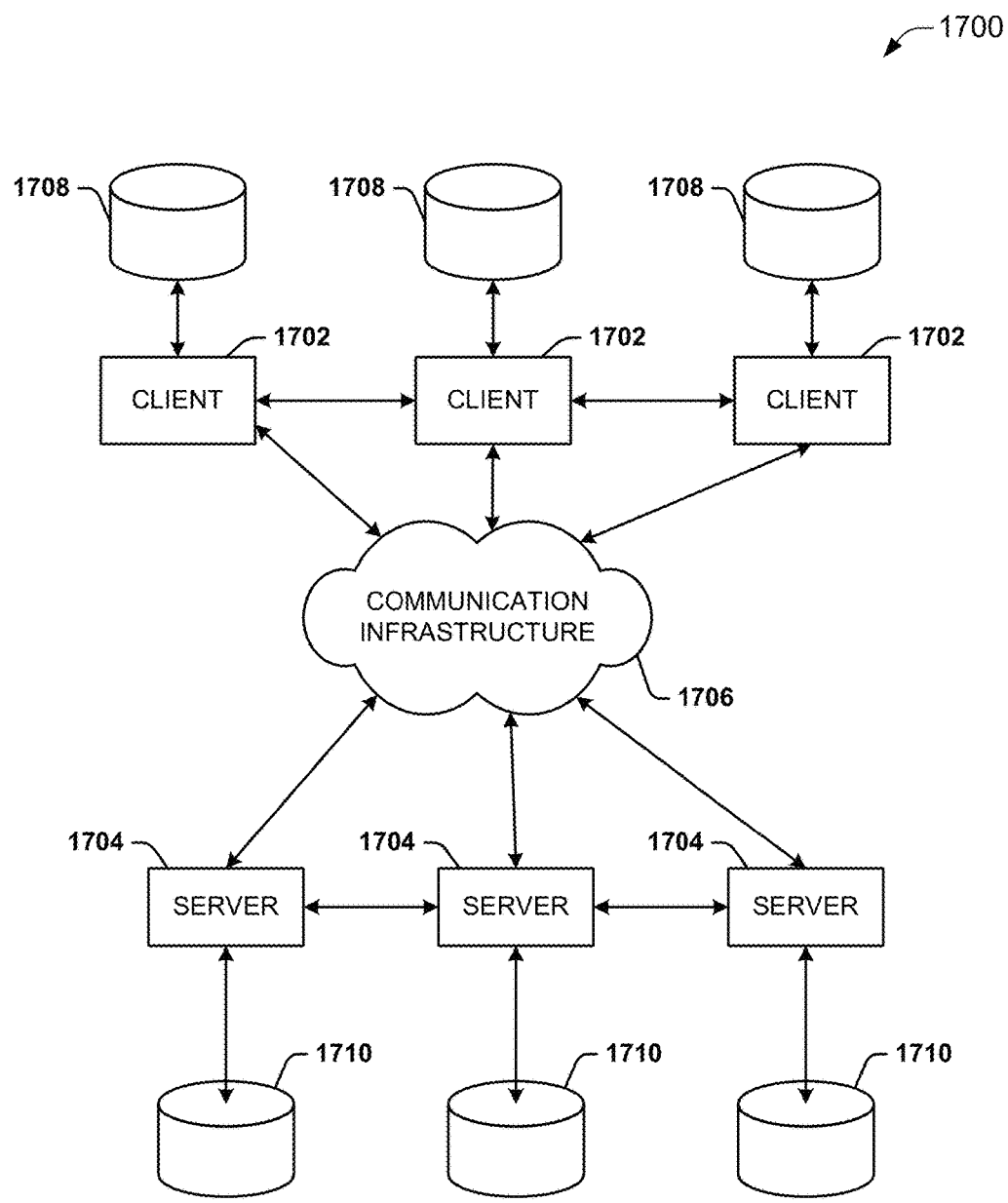
FIG. 17 is a block diagram an exemplary networking environment.

FIG. 17 is a schematic block diagram of an exemplary computing environment 1700 in which the various exemplary, non-limiting embodiments presented herein can execute/be performed. The system 1700 includes one or more client(s) 1702. The client(s) 1702 can comprise of hardware and/or software (e.g., threads, processes, computing devices). System 1700 further includes one or more server(s) 1704, where server(s) 1704 can also comprise of hardware and/or software (e.g., threads, processes, computing devices). The servers 1704 can house threads to perform transformations by employing one or more embodiments as described herein, for example. One possible communication between a client 1702 and a server 1704 can be in the form of a data packet adapted to be transmitted between two or more computer processes. Further, system 1700 includes a communication infrastructure 1706 which can be employed to facilitate communications between the client(s) 1702 and the server(s) 1704. The client(s) 1702 are operably connected to one or more client data store(s) 1708 that can be employed to store information local to the client(s) 1702. Similarly, the server(s) 1704 are operably connected to one or more server data store(s) 1710 that can be employed to store information local to the servers 1704.

As mentioned above, while exemplary embodiments have been described in connection with various computing devices and network architectures, the underlying concepts may be applied to any network system and any computing device or system in which it is desirable to implement controlling ability to send a communication, control television viewing, control time spent playing a computer game, and the like.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein can be contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

The word "exemplary" is used herein to mean serving as an example, instance, or illustration. For the avoidance of doubt, the various aspects presented herein are not limited by such examples. In addition, any aspect or design described herein as "exemplary" is not necessarily to be construed as preferred or advantageous over other aspects or designs, nor is it meant to preclude equivalent exemplary structures and techniques known to those having skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

Further, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

As used in this application, the terms "component", "system", "platform", "layer", "controller", "terminal", "station", "node", "interface", etc., are intended to refer to a computer-related entity or an entity related to, or that is part of, an operational apparatus with one or more specific functionalities, wherein such entities can be either hardware, a combination of hardware and software, software, or software in execution. For example, a component may be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on computer and the computer can be a component. One or more components may reside within a process and/or thread of execution and a component may be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include I/O components as well as associated processor, application, or Application Programming Interface (API) components. While the foregoing examples are directed to aspects of a component, the exemplified aspects or features also apply to a system, platform, interface, layer, controller, terminal, and the like.

As mentioned, a computer can typically include a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. Further, computer instructions/operations can be stored in memory in the form of non-transitory, or tangible, computing elements (e.g., computer readable storage medium), where such instructions/operations can be executed, e.g., by a processor, to facilitate operation of one or more exemplary, non-limiting embodiments, as presented herein.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the exemplary, non-limiting embodiments can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies previously described.

Various embodiments described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the various aspects presented herein are not to be limited to any single embodiment, but rather is to be construed in breadth, spirit and scope in accordance with the appended claims.

What is claimed is:

1. A method, comprising:
receiving, by a system including a processor, a test generator component, and a message component, from a first device a setting N for a maximum number of messages that can be transmitted from a second device before an ability to transmit messages from the second device is disabled, wherein the first device and the second device are remotely located;
receiving from the first device a question category for one or more questions to be presented on the second device in response to an event that the maximum number of messages that can be transmitted from the second device has been reached;
obtaining a first question from a third device, wherein the first question pertains to the question category, the first question includes a plurality of answers, the plurality of answers comprising a correct answer and at least one incorrect answer, the first question is uploaded to the third device from a fourth device, the fourth device is located in an educational institute attended by a user of the second device, and the first question pertains to a course to be completed by the user of the second device, wherein in the event of a first total number of messages sent from the second device matches the setting N message transmission from the second device is disabled and the first question is to be presented upon the second device, wherein the first question is to be correctly answered before message transmission from the second device can be re-enabled;
forwarding the setting N to the second device; and
forwarding to the second device, the first question and the plurality of answers pertaining to the first question.

2. The method of claim 1, further comprising receiving an indication from the second device that the question was answered correctly and the question had at least one reward for being correctly answered.

3. The method of claim 2, further comprising forwarding the reward to the second device, wherein the reward comprises at least one of a concert ticket, a theatre ticket, a movie ticket, a music download, or a redeemable coupon.

4. The method of claim 1, wherein the third device is a data store, the data store having stored therein a plurality of questions including the first question.

5. The method of claim 4, wherein the plurality of questions include subject matter pertaining to at least one of a test, an academic test, a standardized test, a general knowledge test, an intelligence quotient test, a game, trivia, a multi-lingual test, a competition, a reward program, or self-study.

6. The method of claim 1, wherein the messages transmitted from the second device are generated in accordance with a short message service (SMS), multimedia messaging service (MMS), enhanced messaging service (EMS), or a text messaging service.

7. The method of claim 1, wherein the second device is a cellular phone.

8. The method of claim 1, further comprising:
receiving an indication from the second device that the first question was correctly answered and that the ability to transmit a message from the second device has been re-enabled;
receiving an indication from the second device that messaging from the second device has been re-enabled;
receiving an indication from the second device that a subsequent number of messages transmitted from the second device equals the setting N, wherein message transmission from the second device has been disabled; and
forwarding a second question to the second device, wherein the second question includes a plurality of answers, the plurality of answers comprising a correct answer and at least one incorrect answer, wherein in the event of message transmission from the second device being disabled, the second question is to be presented upon the second device and is to be correctly answered before message transmission from the second device can be re-enabled.

9. The method of claim 1, wherein the first question is generated by a teacher who is teaching the course to the user of the second device, the user of the second device attends the educational institute.

10. A system comprising:
a memory including at least one computer-executable instruction;
a processor configured to execute at least one computer-executable instruction, wherein in response to execution by the processor, the at least one computer-executable instruction implements components comprising:
a test generator component configured to:
receive from a first device a setting N for a maximum number of messages that can be transmitted from a second device before an ability to transmit messages from the second device is disabled, wherein the first device and the second device are remotely located;
receive from the first device a question category for one or more questions to be presented on the second device in response to an event that the maximum number of messages that can be transmitted from the second device has been reached;
obtain a first question from a third device, wherein the first question pertains to the question category, the first question is uploaded to the third device from a fourth device, the fourth device is located in an educational institute attended by a user of the second device, and the first question pertains to a course to be completed by the user of the second device, the first question includes a plurality of answers, the plurality of answers comprising a correct answer and at least one incorrect answer, wherein in the event of a first total number of messages sent from the second device matches the setting N, message transmission from the second device is disabled and the first question is to be presented upon the second device, wherein the second question is to be correctly answered before message transmission from the second device can be re-enabled;
forwarding the setting N to the second device; and
a message component configured to:
forward to the second device, the first question and the plurality of answers pertaining to the first question.

11. The system of claim 10, the message component further configured to receive an indication from the second device that the question was answered correctly and the question had at least one reward for being correctly answered.

12. The system of claim 11, further comprising
a reward generator component configured to generate a reward; and the message component further configured to receive the reward from the reward generator component and forward the reward to the second device, wherein the reward comprises at least one of a concert ticket, a theatre ticket, a movie ticket, a music download, or a redeemable coupon.

13. The system of claim 11, wherein the messages transmitted from the second device are generated in accordance with a short message service (SMS), multimedia messaging service (MMS), enhanced messaging service (EMS), or a text messaging service.

14. The system of claim 11, wherein the second device is a cellular phone.

15. The system of claim 11, wherein the test generator component is further configured to:
receive an indication from the second device that the first question was correctly answered and that the ability to transmit a message from the second device has been re-enabled;
receive an indication from the second device that messaging from the second device has been re-enabled;
receive an indication from the second device that a subsequent number of messages transmitted from the second device equals the setting N, wherein message transmission from the second device has been disabled;
receive, from the third device, a second question, the second question is uploaded to the third device from the fourth device, wherein the second question includes a plurality of answers, the plurality of answers comprising a correct answer and at least one incorrect answer, wherein in the event of message transmission from the second device being disabled, the second question is to be presented upon the second device and is to be correctly answered before message transmission from the second device can be re-enabled; and
the message component is further configured to forward the second question to the second device.

16. The system of claim 10, wherein the third device is a data store, the data store having stored therein a plurality of questions including the first question.

17. The system of claim 16, wherein the plurality of questions include subject matter pertaining to at least one of a test, an academic test, a standardized test, a general knowledge test, an intelligence quotient test, a game, trivia, a multi-lingual test, a competition, a reward program, or self-study.

18. The system of claim 10, wherein first question is generated by a teacher who is teaching the course to the user of the second device, the user of the second device attends the educational institute.

19. A non-transitory computer-readable storage medium comprising instructions that, when executed by a processor, cause the processor to perform acts comprising:
receiving from a first device a setting N for a maximum number of messages that can be transmitted from a second device before an ability to transmit messages from the second device is disabled, wherein the first device and the second device are remotely located;
receiving from the first device a question category for one or more questions to be presented on the second device in response to an event that the maximum number of messages that can be transmitted from the second device has been reached;
obtaining a first question from a third device, wherein the first question pertains to the question category, the first question is uploaded to the third device from a fourth device, the fourth device is located in an educational institute attended by a user of the second device, and the first question pertains to a course to be completed by the user of the second device, wherein the first question is generated by a teacher who is teaching the course to the user of the second device, the user of the second device attends the educational institute, the first question includes a plurality of answers, the plurality of answers comprising a correct answer and at least one incorrect answer, wherein in the event of a first total number of messages sent from the second device matches the setting N, message transmission from the second device is disabled and the first question is to be presented upon the second device, wherein the second question is to be correctly answered before message transmission from the second device can be re-enabled;
forwarding the setting N to the second device; and
forwarding to the second device, the first question and the plurality of answers pertaining to the first question.

20. The computer-readable medium of claim 19, wherein the second device is a cellular phone.

* * * * *